United States Patent
Matsumoto

(10) Patent No.: US 10,464,438 B2
(45) Date of Patent: Nov. 5, 2019

(54) POWER CONDITIONING SYSTEM AND CONTROL METHOD THEREFOR

(71) Applicant: NISSAN MOTOR CO., LTD., Yokohama-shi, Kanagawa (JP)

(72) Inventor: Michihiko Matsumoto, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/751,249

(22) PCT Filed: Aug. 11, 2015

(86) PCT No.: PCT/JP2015/072796
§ 371 (c)(1),
(2) Date: Feb. 8, 2018

(87) PCT Pub. No.: WO2017/026059
PCT Pub. Date: Feb. 16, 2017

(65) Prior Publication Data
US 2018/0236893 A1    Aug. 23, 2018

(51) Int. Cl.
*H02M 3/155* (2006.01)
*B60L 11/18* (2006.01)
(Continued)

(52) U.S. Cl.
CPC ........... *B60L 11/1887* (2013.01); *B60L 50/50* (2019.02); *B60L 58/40* (2019.02); *H01M 8/04* (2013.01);
(Continued)

(58) Field of Classification Search
CPC ............ H02J 1/102; H02M 1/36; H02M 1/38; H02M 1/15; H02M 3/1584; H02M 3/155;
(Continued)

(56) References Cited

U.S. PATENT DOCUMENTS

2006/0114702 A1* 6/2006 Yamada ............... H02M 1/38
                                                     363/132
2009/0146493 A1* 6/2009 Fujino ............... B60L 15/2045
                                                     307/9.1
(Continued)

FOREIGN PATENT DOCUMENTS

EP    2 154 772 A1    2/2010
JP    2009-199864 A   9/2009
(Continued)

*Primary Examiner* — Jared Fureman
*Assistant Examiner* — Emmanuel Dominique
(74) *Attorney, Agent, or Firm* — Foley & Lardner LLP

(57) ABSTRACT

A power conditioning system that includes a fuel cell to be connected to a load, a fuel cell converter connected between the fuel cell and the load, the fuel cell converter converting an output voltage of the fuel cell at a predetermined required voltage ratio, a battery connected in parallel with the fuel cell with respect to the load, the battery serving as a power supply source different from the fuel cell, a battery converter connected between the battery and the load, the battery converter converting an output voltage of the battery at a predetermined required voltage ratio, a voltage adjusting unit configured to adjust an output voltage of the battery converter to a predetermined voltage to generate a DC link voltage for synchronizing an output voltage of the fuel cell converter and the output voltage of the battery converter, and a ripple suppressing unit configured to cause the battery converter to suppress a ripple component of the DC link voltage in a situation where the DC link voltage is higher than the output voltage of the battery.

11 Claims, 14 Drawing Sheets

(51) Int. Cl.
  *H01M 8/04* (2016.01)
  *H02M 1/15* (2006.01)
  *H02M 1/36* (2007.01)
  *H02M 1/38* (2007.01)
  *H02M 3/158* (2006.01)
  *H02J 1/10* (2006.01)
  *B60L 50/50* (2019.01)
  *B60L 58/40* (2019.01)

(52) U.S. Cl.
  CPC .............. *H02J 1/102* (2013.01); *H02M 1/15* (2013.01); *H02M 1/36* (2013.01); *H02M 1/38* (2013.01); *H02M 3/155* (2013.01); *H02M 3/1584* (2013.01); *B60L 2210/10* (2013.01); *Y02T 10/7216* (2013.01); *Y02T 90/34* (2013.01)

(58) Field of Classification Search
  CPC ........ B60L 11/18; B60L 8/04; B60L 2210/10; Y02T 10/7216; Y02T 10/7022; H01M 8/04
  See application file for complete search history.

(56) References Cited

U.S. PATENT DOCUMENTS

| | | | | |
|---|---|---|---|---|
| 2009/0166114 | A1* | 7/2009 | Taguchi | H02M 3/156 180/65.265 |
| 2010/0131136 | A1* | 5/2010 | Ichikawa | H02J 1/102 701/22 |
| 2012/0106204 | A1* | 5/2012 | Imanishi | H02M 3/1584 363/16 |
| 2014/0225435 | A1* | 8/2014 | Imanishi | H02M 1/44 307/10.1 |
| 2017/0025891 | A1* | 1/2017 | Kim | H02J 9/061 |

FOREIGN PATENT DOCUMENTS

| | | |
|---|---|---|
| JP | 5143665 B2 | 2/2013 |
| JP | 2014-14235 A | 1/2014 |
| JP | 2015-88238 A | 5/2015 |
| WO | WO 2011/004486 A1 | 1/2011 |
| WO | WO 2013/035147 A1 | 3/2013 |

\* cited by examiner

POWER CONDITIONING SYSTEM AND CONTROL METHOD THEREFOR

TECHNICAL FIELD

The present invention relates to a power conditioning system with twin converters and a control method therefor.

BACKGROUND ART

A power conditioning system with a fuel cell is known in which output power of the fuel cell can be supplied to a load connected to the fuel cell by supplying fuel gas (e.g. hydrogen) and oxidant gas (e.g. air) to the fuel cell according to a request of the load.

In the power conditioning system as described above, a high-voltage battery is normally provided in parallel with the fuel cell with respect to the load. This battery assists power generated by the fuel cell by outputting stored power to the load in response to a request of the load.

In such a power conditioning system, converters for converting each output voltage at a predetermined required voltage ratio may be provided between the fuel cell and the load and between the battery and the load on the basis of a voltage required by the load, an outputtable voltage of the fuel cell and a charge voltage of the battery.

JP5143665B discloses a power system in which a fuel cell and a battery are provided in parallel with respect to a load and a converter is provided at each of output sides of the fuel cell and the battery. This power system is configured to control at least one of output currents of the fuel cell and the battery by the converter for the other.

Further, in the case of installing a power conditioning system in a vehicle, regenerative power is generated if a drive motor performs a regeneration operation during downhill running or deceleration of the vehicle. This regenerated power is utilized to charge a battery on the basis of a state of charge of the battery. As just described, a current flow from the battery to a load and a current flow from the load to the battery are generated in a battery converter.

SUMMARY OF INVENTION

The inventor of the present application found out a problem that, in such a power conditioning system with two converters (twin converters), the controllability of the battery converter was degraded if a current passing through the battery converter (hereinafter, referred to as a "passing current") was near 0A and an output current of a fuel cell was in a low current region.

Specifically, if a switching operation of a fuel cell converter is started under such a situation, there is a problem that the controllability of a DC link voltage serving as an output voltage of the fuel cell converter and an output voltage of the battery converter is poor and the DC link voltage overshoots with respect to a control amount.

This DC link voltage is a voltage to be applied to a travel motor (drive motor) of a vehicle after direct current to alternating current conversion by an inverter. Thus, the controllability is degraded due to the overshooting of the DC link voltage, and a torque variation occurs in the drive motor in a subsequent stage.

Such a problem is supposed to occur due to the following cause. Specifically, under a condition that the output voltage of the fuel cell is larger than that of the battery, a control delay occurs when step-down and step-up switching elements of the battery converter are switched. It is supposed that, due to this switching control delay, the output current of the fuel cell charges a smoothing capacitor on a DC link side without flowing toward the battery and the DC link voltage overshoots.

The present invention was developed, focusing on the above problem and aims to provide a power conditioning system capable of solving the overshooting of a controlled DC link voltage by solving a control delay of a battery converter and a control method therefor.

According to an aspect of this invention, there is provided a power conditioning system that includes a fuel cell to be connected to a load, a fuel cell converter connected between the fuel cell and the load, the fuel cell converter converting an output voltage of the fuel cell at a predetermined required voltage ratio, a battery connected in parallel with the fuel cell with respect to the load, the battery serving as a power supply source different from the fuel cell, a battery converter connected between the battery and the load, the battery converter converting an output voltage of the battery at a predetermined required voltage ratio. The power conditioning system includes a voltage adjusting unit configured to adjust an output voltage of the battery converter to a predetermined voltage to generate a DC link voltage for synchronizing an output voltage of the fuel cell converter and the output voltage of the battery converter, a ripple suppressing unit configured to cause the battery converter to suppress a ripple component of the DC link voltage in a situation where the DC link voltage is higher than the output voltage of the battery.

DESCRIPTION OF EMBODIMENTS

Hereinafter, embodiments of the present invention are described with reference to the accompanying drawings.

(First Embodiment)

Figure 1:
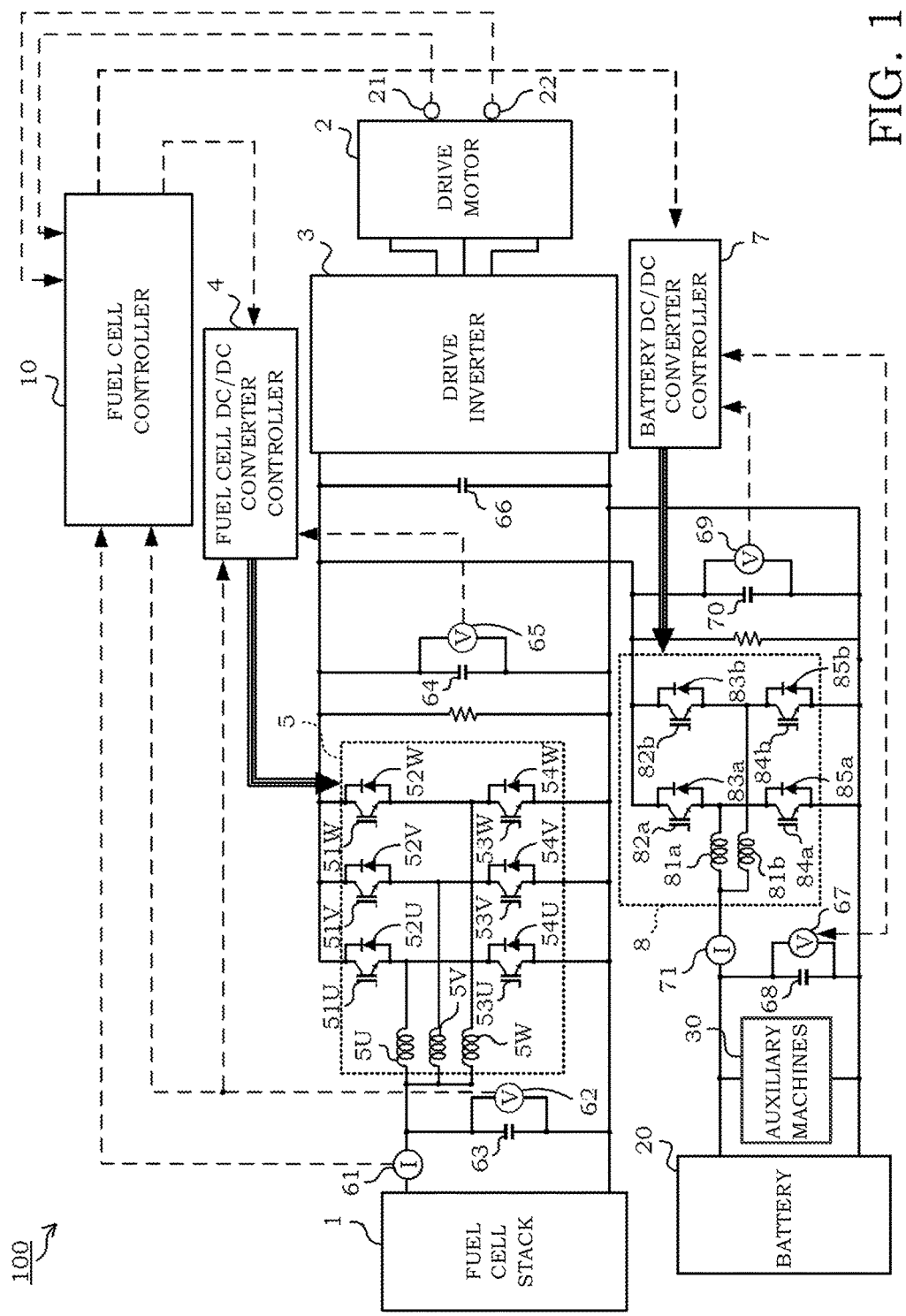
FIG. 1 is a diagram showing an entire configuration of a power conditioning system for fuel cell in a first embodiment of the present invention.

FIG. 1 is a diagram showing an entire configuration of a power conditioning system 100 for fuel cell (hereinafter, merely referred to as the "power conditioning system 100") in a first embodiment of the present invention. The power conditioning system 100 of the present invention includes a high-voltage battery and is used in a vehicle including fuel cells as a drive source. As shown in FIG. 1, this power conditioning system 100 is, for example, mounted in an electric vehicle driven by a drive motor 2. It should be noted that this power conditioning system 100 can be applied to loads in devices other than fuel cell vehicles (electric vehicles utilizing fuel cells) if a fuel cell is used as a drive source.

The power conditioning system 100 of this embodiment includes, as shown in FIG. 1, a fuel cell stack 1, a DC/DC converter 5 for the fuel cell stack 1 (fuel cell converter), a high-voltage battery 20 (hereinafter, referred to as the "battery 20"), auxiliary machines 30 and a DC/DC converter 8 for the battery 20 (battery converter). Further, the power conditioning system 100 includes a fuel cell controller 10 for controlling the entire power conditioning system 100 including the fuel cell stack 1, a fuel cell DC/DC converter controller 4 for controlling the DC/DC converter 5 and a battery DC/DC converter controller 7 for controlling the DC/DC converter 8. Furthermore, the power conditioning system 100 includes the drive motor 2 serving as a load and a drive inverter 3 for switchingly controlling direct-current power input from the fuel cell stack 1 and the battery 20 to alternating-current power to the drive motor 2.

The DC/DC converter 5 for the fuel cell stack 1 is provided between the fuel cell stack 1 and the drive inverter 3 (drive motor 2). This DC/DC converter 5 is for converting an output voltage of the fuel cell stack 1 into an input voltage of the drive inverter 3 at a predetermined required voltage ratio. In the present embodiment, the DC/DC converter 5 is a step-up converter for stepping up the output voltage of the fuel cell stack 1 to a voltage suitable as a drive voltage of the drive motor 2.

In the present embodiment, the DC/DC converter 5 is constituted of a three-phase converter. It should be noted that the DC/DC converter 5 may have three or more phases or a single phase.

As shown in FIG. 1, the DC/DC converter 5 is composed of three converters, i.e. a U-phase converter, a V-phase converter and a W-phase converter. Three reactors 5U, 5V and 5W are respectively included in the U-, V- and W-phase converters. It should be noted that the U-, V- and W-phase converters have a similar configuration. Thus, the configuration of the U-phase converter is described as a representative below.

The U-phase converter includes the reactor 5U, a step-down side switching element 51U, a rectifying diode 52U, a step-up side switching element 53U and a reflux diode 54U. The switching element 51U is connected in reverse parallel to the rectifying diode 52U, and the switching element 53U is connected in reverse parallel to the reflux diode 54U. These switching elements 51U, 53U are, for example, constituted by IGBTs (Insulated Gate Bipolar Transistors).

One end of the reactor 5U is connected to an output terminal on a positive electrode side of the fuel cell stack 1 via a current sensor 61 and the other end is connected to one ends of the switching element 51U and the rectifying diode 52U and one ends of the switching element 53U and the reflux diode 54U. The other ends of the switching element 51U and the rectifying diode 52U are connected to an input terminal on a positive electrode side of the drive inverter 3. Further, the other ends of the switching element 53U and the reflux diode 54U are connected to an output terminal on a negative electrode side of the fuel cell stack 1 and an input terminal on a negative electrode side of the drive inverter 3.

A voltage sensor 62 for detecting an output voltage of the fuel cell stack 1 and a capacitor 63 for smoothing the output voltage of the fuel cell stack 1 are connected in parallel between the output terminals of the fuel cell stack 1. The capacitor 63 is for smoothing the output voltage of the fuel cell stack 1, thereby being able to reduce a ripple component in an output of the fuel cell stack 1.

Further, a capacitor 64 for smoothing an output voltage of the DC/DC converter 5 and a voltage sensor 65 for detecting the output voltage of the DC/DC converter 5 (input voltage of the drive inverter 3) are connected in parallel between output terminals of the DC/DC converter 5. A ripple component in an output of the DC/DC converter 5 can be reduced by this capacitor 64.

Furthermore, a capacitor 66 for smoothing an input voltage of the drive inverter 3 is provided between a connection terminal of the output terminal of the DC/DC converter 5 and an output terminal of the DC/DC converter 8 and the input terminal of the drive inverter 3.

The fuel cell stack 1 is connected to the drive motor 2 serving as a load of the power conditioning system 100 via the DC/DC converter 5 and the drive inverter 3. The fuel cell stack 1 is a laminated battery for generating power according to an electrical load such as the drive motor 2 upon receiving the supply of cathode gas (oxidant gas) and anode gas (fuel gas) from unillustrated cathode gas supplying/discharging device and anode gas supplying/discharging device. For example, several hundreds of fuel cells are laminated in the fuel cell stack 1.

Many devices such as anode gas supply and discharge passages, cathode gas supply and discharge passages, pressure control valves provided in each passage, a cooling water circulation passage, a cooling water pump, a radiator and a cooling device of the fuel cell stack 1 are connected to the fuel cell stack 1. However, these are not shown since having a low relationship with technical features of the present invention.

The drive motor 2 drives the vehicle equipped with the power conditioning system 100 of the present embodiment. The drive inverter 3 converts direct-current power supplied from the fuel cell stack 1 and battery into alternating-current power and supplies the converted alternating-current power to the drive motor 2. The drive motor 2 is rotationally driven by the alternating-current power supplied by the drive inverter 3 and supplies the rotational energy thereof to the subsequent stage. It should be noted that, although not shown, the drive motor 2 is coupled to drive wheels of the vehicle via a differential and a shaft.

During downhill running or deceleration of the vehicle, regenerative power of the drive motor 2 is supplied to the battery 20 to charge the battery 20 via the drive inverter 3 and the DC/DC converter 8 according to a state of charge of the battery 20. Further, during power running of the vehicle, the drive motor 2 is rotated by generated power of the fuel cell stack 1 and stored power from the battery 20 and the rotational energy thereof is transmitted to the unillustrated drive wheels of the vehicle.

A motor rotation speed detector 21 for detecting a motor rotation speed of the drive motor 2 and a motor torque detector 22 for detecting a motor torque of the drive motor 2 are provided near the drive motor 2. The motor rotation speed and the motor torque of the drive motor 2 detected by these detectors 21, 22 are output to the fuel cell controller 10.

The battery 20 is a chargeable secondary battery and, for example, a lithium ion battery of 300 V (volts). The battery 20 is connected to the auxiliary machines 30 and constitutes a power supply for the auxiliary machines 30. Further, the battery 20 is connected to the drive inverter 3 and the DC/DC converter 5 via the DC/DC converter 8. Specifically, the battery 20 is connected to the drive motor 2 serving as the load of the power conditioning system 100 in parallel with the fuel cell stack 1.

A voltage sensor 67 for detecting an output voltage of the battery 20 and a capacitor 68 for smoothing the output voltage of the battery 20 are connected to the output terminals of the battery 20 in parallel with the auxiliary machines 30.

The DC/DC converter 8 for the battery 20 is provided between the battery 20 and the drive inverter 3 (drive motor 2). This DC/DC converter 8 converts the output voltage of the battery 20 into an input voltage of the drive inverter 3 at a predetermined required voltage ratio. It should be noted that, as described later, an output voltage of the DC/DC converter 8 is controlled to be linked (synchronized) with the output voltage of the DC/DC converter 5.

In the present embodiment, the DC/DC converter 8 is a converter having two phases, i.e. composed of an a-phase converter and a b-phase converter unlike the DC/DC converter 5 for the fuel cell stack 1. It should be noted that the number of phases of the DC/DC converter 8 is not limited to two and may be three or more in consideration of a voltage required by the load and the like.

Two reactors 81a, 81b are respectively included in the a-phase converter and the b-phase converter. It should be noted that the a-phase converter and the b-phase converter have a similar configuration. Thus, the configuration of the a-phase converter is described as a representative below.

As shown in FIG. 1, the a-phase converter includes a reactor 81a, a step-down side switching element 82a, a rectifying diode 83a, a step-up side switching element 84a and a reflux diode 85a. The switching element 82a is connected in reverse parallel to the rectifying diode 83a, and the switching element 84a is connected in reverse parallel to the reflux diode 85a. These switching elements 82a, 84a are, for example, constituted by IGBTs.

One end of the reactor 81a is connected to the output terminal on the positive electrode side of the battery 20 and the other end is connected to one ends of the switching element 82a and the rectifying diode 83a and one ends of the switching element 84a and the reflux diode 85a. The other ends of the switching element 82a and the rectifying diode 83a are connected to the input terminal on the positive electrode side of the drive inverter 3. Further, the other ends of the switching element 84a and the reflux diode 85a are connected to the output terminal on the negative electrode side of the battery 20 and the input terminal on the negative electrode side of the drive inverter 3.

A capacitor 70 for smoothing the output voltage of the DC/DC converter 8 and a voltage sensor 69 for detecting the output voltage of the DC/DC converter 8 (DC link voltage) are connected between the output terminals of the DC/DC converter 8.

The auxiliary machines 30 are components mainly belonging to the fuel cell stack 1 and includes the cathode gas supplying/discharging device and the anode gas supplying/discharging device as described above, an unillustrated air compressor, a cooling pump and the like. It should be noted that if various components of the auxiliary machines 30 are light electrical instruments, an unillustrated step-down DC/DC converter may be provided between the battery 20 and the targeted auxiliary machines 30. Instead of that, an unillustrated weak battery for light electrical instruments may be provided.

Although not shown, the fuel cell controller 10 is configured by a microcomputer including a central processing unit (CPU), a read-only memory (ROM), a random access memory (RAM) and an input/output interface (I/O interface). An output current value and an output voltage value of the fuel cell stack 1 detected by the current sensor 61 and the voltage sensor 62 are input to the fuel cell controller 10.

Further, the fuel cell controller 10 outputs commands for operating the DC/DC converters 5 and 8 respectively to the fuel cell DC/DC converter controller 4 and the battery DC/DC converter controller 7 on the basis of the output current value and the output voltage value of the fuel cell stack 1 input from each sensor 61, 62 and the motor rotation speed and the motor torque of the drive motor 2 input from each detector 21, 22.

The fuel cell DC/DC converter controller 4 controls the DC/DC converter 5 on the basis of the command from the fuel cell controller 10. The fuel cell DC/DC converter controller 4 on/off controls the switching elements 51U to 51W, 53U to 53W of each phase of the DC/DC converter 5 on the basis of the command (FC voltage command) from the fuel cell controller 10 in the present embodiment.

Specifically, the output voltage value of the fuel cell stack 1 (input voltage value of the DC/DC converter 5) detected by the voltage sensor 62 and the output voltage value of the DC/DC converter 5 detected by the voltage sensor 65 are input to the fuel cell DC/DC converter controller 4. The fuel cell DC/DC converter controller 4 switchingly controls each switching element 51U to 51W, 53U to 53W of the DC/DC converter 5 so that a voltage ratio (output voltage/input voltage) of the DC/DC converter 5 reaches a command value (FC voltage command value) from the fuel cell controller 10.

The battery DC/DC converter controller 7 controls the DC/DC converter 8 for the battery 20 on the basis of the command from the battery controller 10. The fuel cell DC/DC converter controller 4 and the battery DC/DC converter controller 7 respectively controls the voltage ratio by the DC/DC converter 5 and the voltage ratio by the DC/DC converter 8 so that the input voltages to the drive inverter 3 become equal (DC link voltage).

The output voltage value of the battery 20 (input voltage value of the DC/DC converter 8) detected by the voltage sensor 67 and the output voltage value of the DC/DC converter 8 detected by the voltage sensor 69 are input to the battery DC/DC converter controller 7. The battery DC/DC converter controller 7 switchingly controls each switching element 82a, 82b, 84a, 84b of the DC/DC converter 8 so that a voltage ratio (output voltage/input voltage) of the DC/DC converter 8 reaches a command value (DC link voltage command value) from the fuel cell controller 10.

Figure 2:
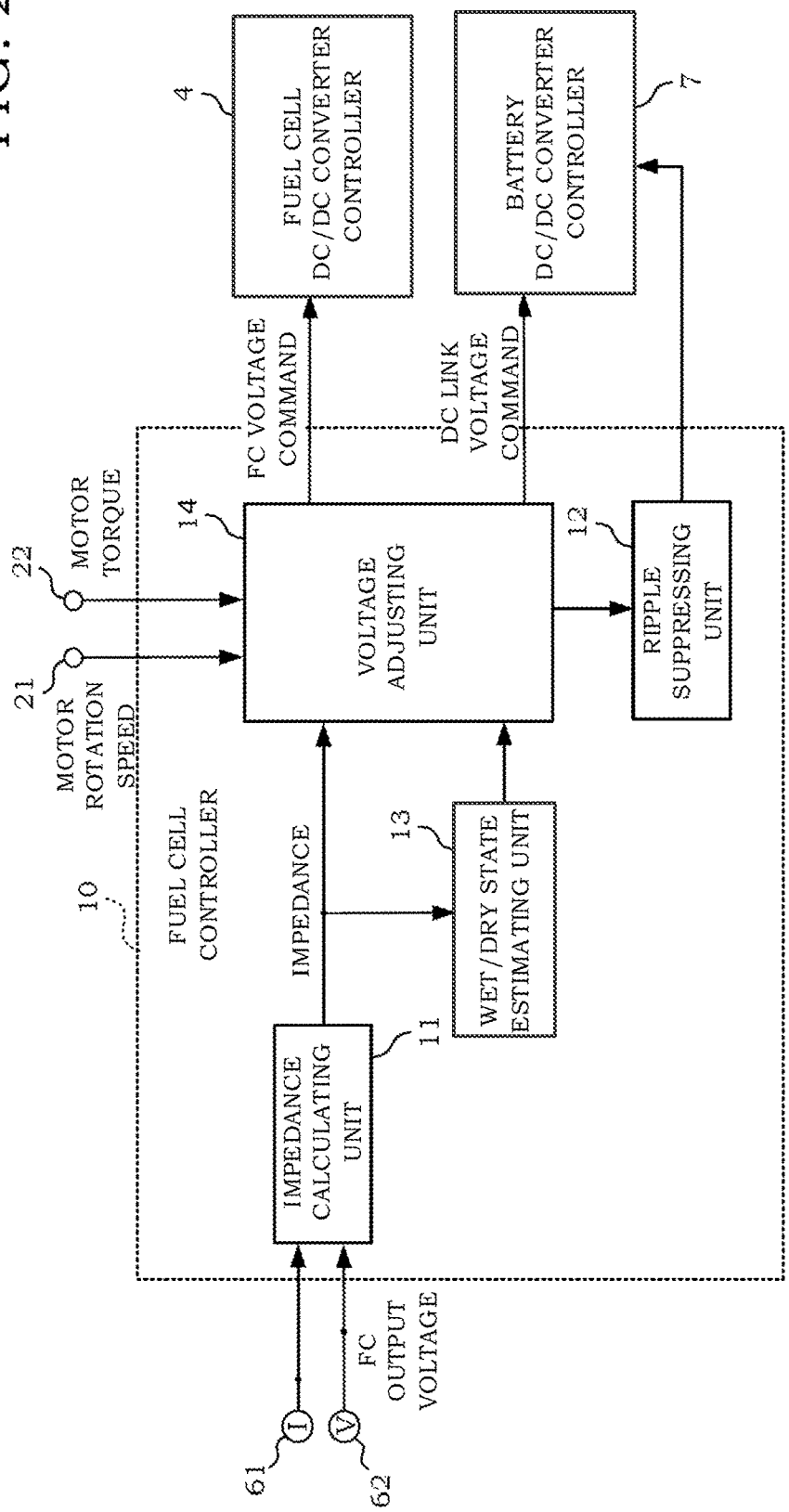
FIG. 2 is a block diagram showing a functional configuration of a fuel cell controller of FIG. 1, FIG. 3 are charts showing waveforms of PWM signals to be output to each switching element of a battery DC/DC converter in the present embodiment, FIG. 4 are charts showing waveforms of triangular waves for generating the PWM signals of the present embodiment.

FIG. 2 is a block diagram showing a functional configuration of the fuel cell controller 10 shown in FIG. 1. As shown in FIG. 2, the fuel cell controller 10 of the present embodiment includes an impedance calculating unit 11, a ripple suppressing unit 12, a wet/dry state estimating unit 13 and a voltage adjusting unit 14.

The impedance calculating unit 11 calculates an impedance (internal impedance) of the fuel cell stack 1 on the basis of an alternating-current component of a predetermined frequency of the output current of the fuel cell stack 1 detected by the current sensor 61 and an alternating-current component of the predetermined frequency of the output voltage detected by the voltage sensor 62. It should be noted that the "predetermined frequency" is, for example, 1 kHz.

It should be noted that, to calculate the impedance of the fuel cell stack 1 by the impedance calculating unit 11, an alternating-current signal of the predetermined frequency is, for example, generated by a switching operation by the switching elements 51U, 53U of the DC/DC converter 5 and the generated alternating-current signal is output to the fuel cell stack 1. Then, the internal impedance of the fuel cell stack 1 can be measured by detecting an output current and an output voltage from the fuel cell stack 1 in that state.

Here, the calculated impedance of the fuel cell stack 1 is correlated with a degree of wetness of the fuel cell stack 1 at the time of detecting the output current and the output voltage of the fuel cell stack 1. Specifically, the higher the impedance of the fuel cell stack 1, the more the fuel cell stack 1 approaches an excessively dry state. On the other hand, the lower the impedance of the fuel cell stack 1, the more the fuel cell stack 1 approaches an excessively wet state.

The ripple suppressing unit 12 suppresses the overshooting of the DC link voltage due to a ripple component (alternating-current component) by controlling the DC/DC converter 8 under a predetermined condition. The "predetermined condition" means that the DC link voltage (in this case, the output voltage of the DC/DC converter 5 for the fuel cell stack 1) is higher than the output voltage of the battery 20 and the amount of current passing through the DC/DC converter 8 is smaller than a predetermined current value (predetermined value).

Here, the "predetermined value" is a value determined from an detection error of a current sensor 71 (or current sensor 61), a current variation width caused by the switching operation of the DC/DC converter 5, a current variation width supposed until the execution of a ripple suppressing process to be described later on the basis of an experiment or simulation.

Under such a condition, a direction of a current passing through the DC/DC converter 8 is frequently switched. If the output current of the fuel cell stack 1 is larger than the amount of current necessary for the drive motor 2, part of this output current flows into the battery 20 via the DC/DC converter 8.

However, if the output voltage of the DC/DC converter 5 (i.e. voltage detected by the voltage sensor 65) serving as the DC link voltage is lower than the output voltage of the DC/DC converter 8 (i.e. voltage detected by the voltage sensor 69), that current is charged into the capacitor 64. If such a surplus current is charged into the capacitor 64 in this way, the DC link voltage leaps and overshoots. The ripple suppressing unit 12 can suppress the overshooting of the DC link voltage by controlling the DC/DC converter 8 via the battery DC/DC converter controller 7.

Figure 3:
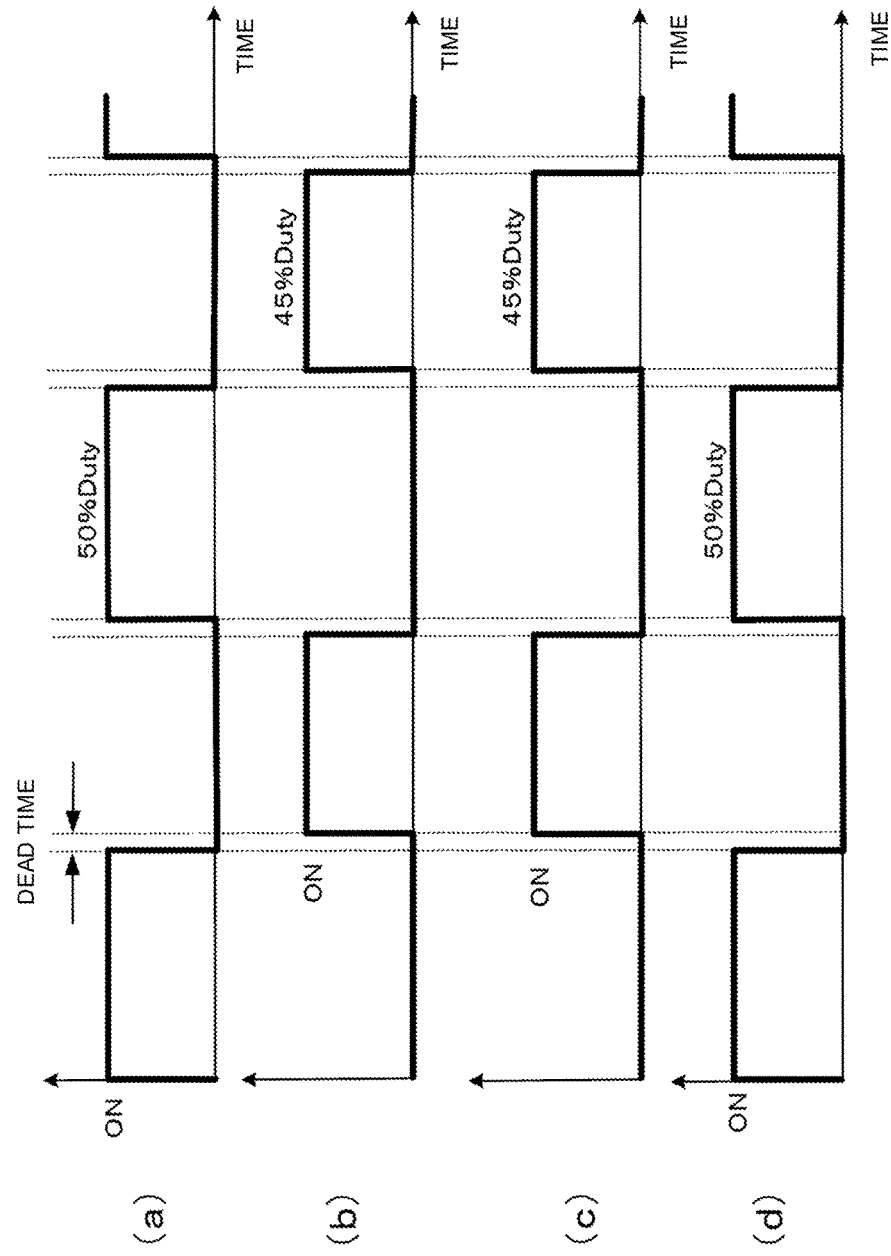

FIG. 3 show waveforms of PWM signals to be output to each switching element 82a, 82b, 84a, 84b of the DC/DC converter 8 for the battery 20 in the present embodiment. It should be noted that a case where the output voltage of the battery 20 is stepped up twofold by the DC/DC converter 8 is described in this example.

FIG. 3(a) shows the waveform of the PWM signal to be output to the switching element 82a and having an ON-duty ratio of 50%. FIG. 3(b) shows the waveform of the PWM signal to be output to the switching element 84a and having an ON-duty ratio of 45%. FIG. 3(c) shows the waveform of the PWM signal to be output to the switching element 82b and having an ON-duty ratio of 45%. FIG. 3(d) shows the waveform of the PWM signal to be output to the switching element 84b and having an ON-duty ratio of 50%.

In the present embodiment, the ripple suppressing unit 12 causes one switching element of the converter of each phase of the DC/DC converter 8 to output the PWM signal having an ON-duty ratio of 50% and causes the other switching element to output the PWM signal having an ON-duty ratio of 45% by the battery DC/DC converter controller 7.

Normally, to prevent a short circuit of the DC/DC converter 8 caused by a control delay, the sum of the step-down switching elements 82a, 82b and that of the step-up switching elements 84a, 84b are not set at 100% and a dead time of 5% is set. Although a short circuit of the DC/DC converter 8 can be effectively prevented by setting this dead time, a control delay occurs. If a switching control of the DC/DC converter 5 for the fuel cell stack 1 is started under a situation where that control delay has occurred, the controllability of the DC link voltage is largely degraded.

Thus, in the present embodiment, this control delay can be effectively suppressed by inputting the shown PWM signals to four switching elements 82a, 82b, 84a and 84b as shown in FIG. 3. Specifically, the ripple suppressing unit 12 sets the sum of the ON-duty ratio of the step-down switching element 82a of the a-phase converter and the ON-duty ratio of the step-up switching element 84b of the b-phase converter to 100%. This is equivalent to a control of the DC/DC converter 8 at a duty ratio of 100% in appearance, and causes no control delay. Thus, the degradation of the controllability of the DC link voltage as described above can be effectively suppressed.

The ripple suppressing unit 12 causes the battery DC/DC converter controller 7 to generate the aforementioned PWM signals to suppress the ripple component of the DC link voltage if a magnitude of the passing current through the DC/DC converter 8 detected by the current sensor 71 is below a predetermined value. A state where this passing current is below the predetermined value is a state of a so-called dead zone of the DC/DC converter 8.

On the other hand, the ripple suppressing unit 12 causes the battery DC/DC converter controller 7 to generate the aforementioned. PWM signals to suppress the ripple component of the DC link voltage if a magnitude of the output current of the fuel cell stack 1 detected by the current sensor 61 is below the predetermined value. As just described, since the ripple component of the DC link voltage is thought to be easily generated when the output current of the fuel cell stack 1 is small, the ripple suppressing process to be described later may be performed also under such a situation.

Here, a PWM signal generation method shown in FIG. 3 is briefly described. If a ratio corresponding to the dead time is, for example, 5%, an ON-duty of one PWM signal is reduced by 2.5% on each side. To generate this signal, triangular waves can be used.

Figure 4:
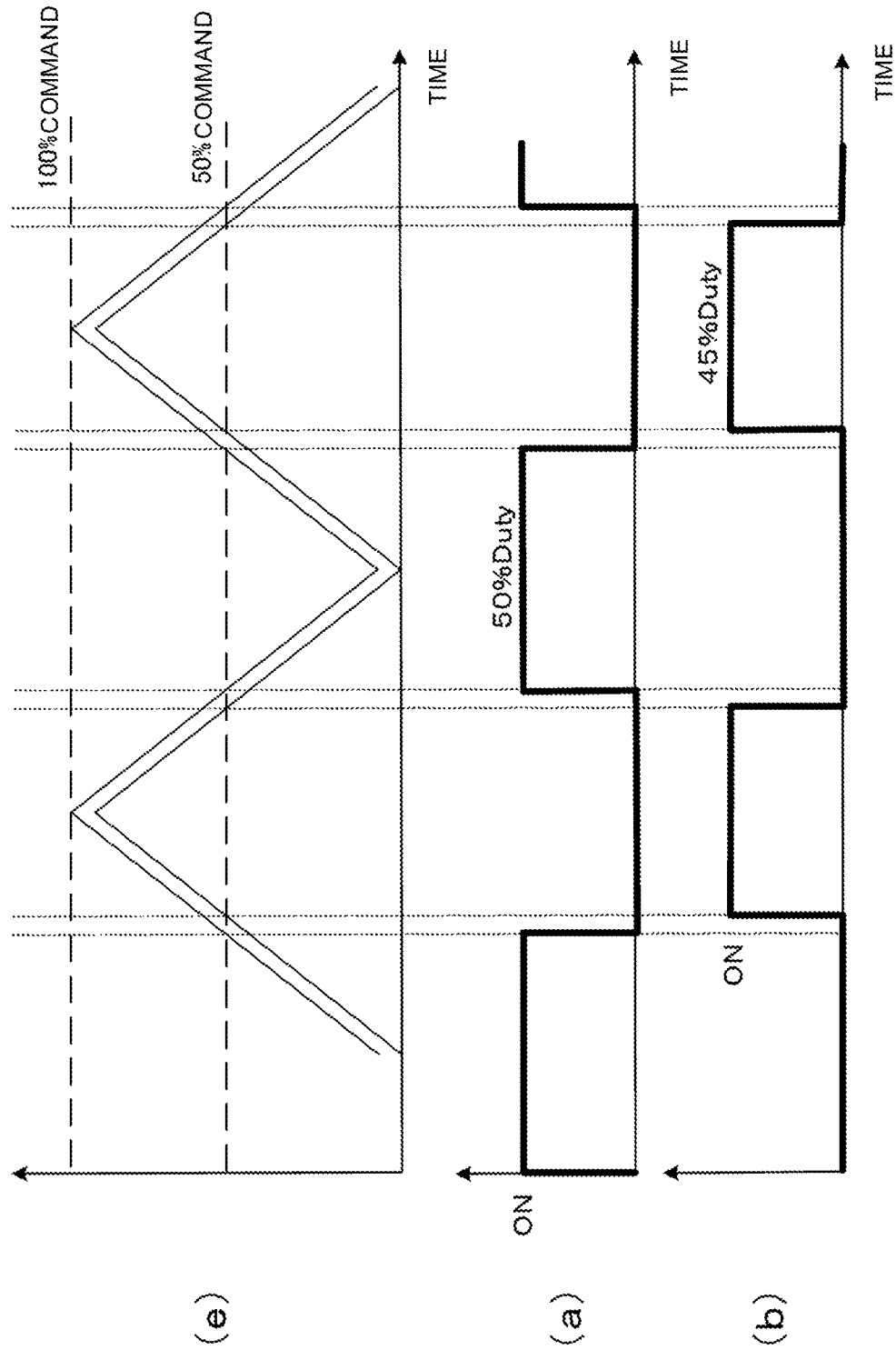

FIG. 4 show waveforms of triangular waves for generating the PWM signals of the present embodiment. As shown in FIG. 4(e), one triangular wave is generated and a similar triangular wave moved upward by a predetermined height is overlapped. Then, a PWM command value is detected on the basis of the required voltage ratio of the DC/DC converter 8, a horizontal line is drawn using that command value, and ON/OFF switched PWM signals are generated on the basis of intersections with each triangular wave. In this way, the PWM waveforms for the command of the DC/DC converter 8 can be easily generated without using special hardware.

Two generated PWM signals are input to the step-down switching element 82a of the a-phase and the step-up switching element 84b of the b-phase with a waveform having an ON-duty ratio of 50%, and the waveform having an ON-duty ratio of 45% is input to the step-up switching element 84a of the a-phase and the step-down switching element 82b of the b-phase.

Referring back to FIG. 2, the wet/dry state estimating unit 13 estimates a wet/dry state of the fuel cell stack 1 on the basis of the internal impedance of the fuel cell stack 1 calculated by the internal impedance calculating unit 11. The wet/dry state of the fuel cell stack 1 thus estimated is used to control the operation of the fuel cell stack 1, particularly supply pressures and supply flow rates of the anode gas and the cathode gas. It should be noted that the operation of the fuel cell stack 1 may be controlled by a known control method according to an operating state thereof. Thus, the control method for the fuel cell stack 1 is not described in detail in this specification.

The estimated wet/dry state of the fuel cell stack 1 is output to the voltage adjusting unit 14 for a step-up control of the output voltage of the fuel cell stack 1 and a DC link control of the output voltage of the battery 20 (control to link (synchronize) the output voltage of the DC/DC converter 5 and the output voltage of the DC/DC converter 8).

The motor rotation speed and the motor torque of the drive motor 2 detected by the motor rotation speed detector 21 and the motor torque detector 22 are input to the voltage adjusting unit 14. The voltage adjusting unit 14 calculates an FC voltage command value representing a drive state of the fuel cell stack 1 and a DC link voltage command value for linking a voltage on the output side of the DC/DC converter 8 for the battery 20 with a voltage on the output side of the DC/DC converter 5 on the basis of various pieces of data of the drive motor 2, the internal impedance of the fuel cell stack 1 calculated by the impedance calculating unit 11, the wet/dry state of the fuel cell stack 1 estimated by the wet/dry state estimating unit 13 and the like.

Then, the voltage adjusting unit 14 outputs the calculated FC voltage command value to the fuel cell DC/DC converter controller 4 and outputs the calculated DC link voltage command value to the battery DC/DC converter controller 7.

Specifically, the voltage adjusting unit 14 determines on the basis of a motor lower limit voltage of the drive motor 2 and the output voltage of the fuel cell stack 1 (i.e. output voltage of the DC/DC converter 5) which of the motor lower limit voltage of the DC/DC converter 5 and the output voltage of the fuel cell stack 1 the DC link voltage command value should be. Then, on the basis of the DC link voltage command value, the fuel cell DC/DC converter controller 4 sets the voltage ratio of the DC/DC converter 5 and the battery DC/DC converter controller 7 sets the voltage ratio of the DC/DC converter 8 for the battery 20.

Further, the voltage adjusting unit 14 calculates a supply voltage of the drive inverter 3, at which the drive motor 2 is operable, on the basis of the motor rotation speed and the motor torque of the drive motor 2 detected by the motor rotation speed detector 21 and the motor torque detector 22.

Furthermore, the voltage adjusting unit 14 is configured to adjust the output voltage of the DC/DC converter for the battery 20 to a predetermined voltage to generate the DC link voltage for synchronizing the output voltage of the DC/DC converter 5 for the fuel cell stack 1 and the output voltage of the DC/DC converter 8 for the battery 20 in the present embodiment.

Figure 5:
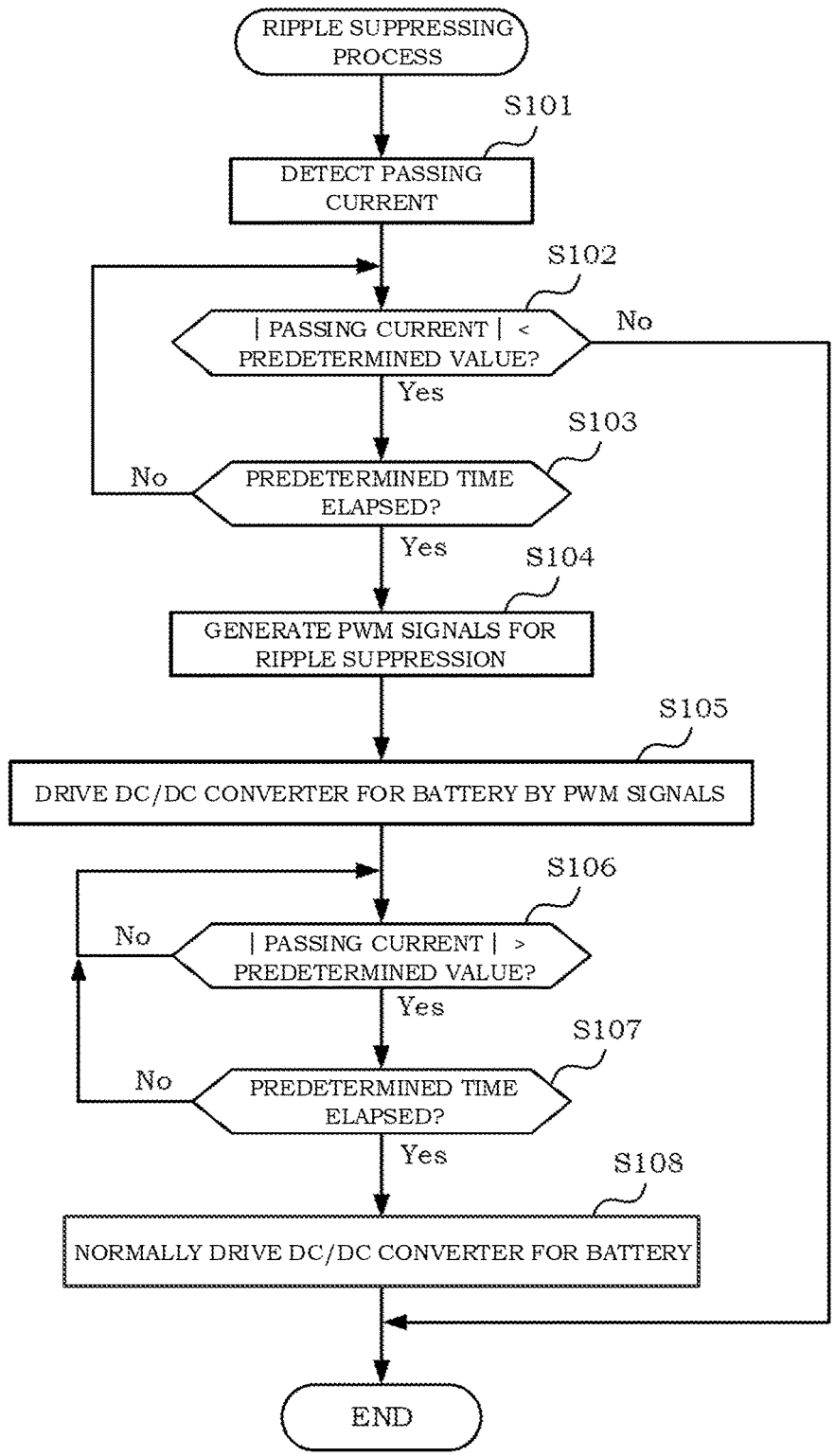
FIG. 5 is a flow chart showing a ripple suppressing process of the present embodiment performed by a fuel cell controller.

Next, the operation of the power conditioning system of the present embodiment is described. FIG. 5 is a flow chart showing the ripple suppressing process of the present embodiment performed by the fuel cell controller 10. The fuel cell controller 10 may perform this ripple suppressing process at a predetermined time interval.

In this ripple suppressing process, the fuel cell controller 10 detects the passing current through the DC/DC converter 8 using the current sensor 71 (Step S101). Then, the fuel cell controller 10 determines whether or not an absolute value of the detected passing current (in which direction this current flows does not matter) is below a predetermined value (Step S102). If the absolute value of the passing current is determined to be equal to or larger than the predetermined value, the fuel cell controller 10 ends this ripple suppressing process.

On the other hand, if the absolute value of the passing current is determined to be below the predetermined value, the fuel cell controller 10 determines whether or not a predetermined time has elapsed after this state was reached (Step S103). The fuel cell controller 10 repeats the processings of Steps S102 and S103 until the predetermined time elapses.

If the predetermined time is determined to have elapsed, the fuel cell controller 10 generates PWM signals for ripple suppression by the method as shown in FIG. 4 (Step S104) and controls the drive of the DC/DC converter 8 for the battery 20 on the basis of the generated PWM signals (Step S105).

Subsequently, the fuel cell controller 10 determines whether or not the absolute value of the passing current through the DC/DC converter 8 has become larger than the predetermined value (Step S106). The fuel cell controller 10 waits in this Step S106 until the absolute value of this passing current is determined to have become larger than the predetermined value. In this way, a PWM control for ripple suppression by the DC/DC converter 8 is executed until a ripple current is sufficiently suppressed.

If the absolute value of the passing current is determined to have become larger than the predetermined value, the fuel cell controller 10 determines whether or not the predetermined time has elapsed after this state was reached (Step S107). The fuel cell controller 10 repeats the processings of Steps S106 and S107 until the predetermined time elapses.

If the predetermined time is determined to have elapsed, the fuel cell controller 10 executes a normal drive control of the DC/DC converter 8 for the battery 20, i.e. a control to step up the voltage to the DC link voltage and ends this ripple suppressing process.

As described above, the power conditioning system 100 of the present embodiment includes the fuel cell stack 1 (fuel cell) to be connected to the drive motor 2 (including the drive inverter 3) serving as a load, the DC/DC converter 5 for the fuel cell stack 1 (fuel cell converter) connected between the fuel cell stack 1 and the drive inverter 3 and configured to convert the output voltage of the fuel cell stack 1 at the predetermined required voltage ratio, the high-voltage battery (secondary battery) 20 (battery) connected in parallel with the fuel cell stack 1 with respect to the drive motor 2 and serving as a power supply source different from the fuel cell stack 1, and the DC/DC converter 8 for the battery 20 (battery converter) connected between the battery 20 and the drive inverter 3 and configured to convert the output voltage of the battery 20 at the predetermined required voltage ratio. Also, the power conditioning system 100 of the present embodiment further includes the voltage adjusting unit 14 configured to adjust the output voltage of the DC/DC converter 8 to the predetermined voltage to generate the DC link voltage for synchronizing the output voltage of the DC/DC converter 5 and the output voltage of the DC/DC converter 8, and the ripple suppressing unit 12 configured to cause the DC/DC converter 8 to suppress the ripple component of the DC link voltage in a situation where the DC link voltage is higher than the output voltage of the battery 20. The power conditioning system 100 of the present embodiment achieves the following functions and effects since having the configuration as described above.

In a situation where the output voltage of the battery 20 is higher the DC link voltage, i.e. in a situation where the output voltage of the battery 20 is stepped up by the DC/DC converter 8, the ripple component of the DC link voltage is suppressed by the DC/DC converter 8 for the battery 20. Since the ripple component of the DC link voltage is suppressed in such a situation in this way, a torque variation of the drive motor 2 can be suppressed. Further, since the overshooting of the DC link voltage can be suppressed, a breakdown voltage limit of an electrical component on the DC link side (output sides of the DC/DC converter 5 and the DC/DC converter 8) can be relaxed. In this way, the manufacturing cost of the entire power conditioning system 100 can be reduced.

In the power conditioning system 100 of the present embodiment, the DC/DC converter 8 for the battery 20 has a plurality of phases (two phases in the present embodiment), and each of the a-phase and the b-phase of the two-phase DC/DC converter 8 for the battery 20 includes the step-up switching element 84a, 84b and the step-down switching element 82a, 82b. The ripple suppressing unit 12 is configured to include the step-up switching element 84b of the battery converter of one phase (b-phase converter in the present embodiment) and the step-down switching element 82a of the battery converter of the other phase (a-phase converter in the present embodiment). The ripple suppressing unit 12 is configured to set the duty ratio of each of the step-up switching element 84b of the b-phase converter and the step-down switching element 82a of the a-phase converter such that the sum (100% in the present embodiment) of the ON-duty ratio (50% in the present embodiment) of the step-up switching element 84b of the b-phase converter and the ON-duty ratio (50% in the present embodiment) of the step-down switching element 82a of the a-phase converter is larger than the sum (95% in the present embodiment) of the ON-duty ratio (45% or 50% in the present embodiment) of the step-up switching element 84a or 84b and the ON-duty ratio (50% or 45% in the present embodiment) of the step-down switching element 82a or 82b in each phase. By setting the duty ratios of the PWM signals in this way, the dead zone can be narrowed when the DC/DC converter 8 is switched to step down or step up the voltage. Thus, the generation of the ripple component of the DC link voltage can be suppressed. Therefore, a torque variation of the drive motor 2 can be suppressed.

In the power conditioning system 100 of the present embodiment, the ripple suppressing unit 12 is configured to set the sum of the ON-duty ratio (50% in the present embodiment) of the step-up switching element 84b of the b-phase converter and the ON-duty ratio (50% in the present embodiment) of the step-down switching element 82a of the a-phase converter to 100%. By setting each ON-duty ratio in this way, the DC/DC converter 8 can be switched to step-up or step down the voltage without setting any control in the dead zone. In this way, the generation of the ripple component of the DC link voltage can be drastically suppressed.

Further, in the power conditioning system 100 of the present embodiment, the a-phase converter and the b-phase converter are configured to set the dead time (5% of the ON-duty ratio in the present embodiment) between the step-up switching element 84a, 84b and the step-down switching element 82a, 82b. This can effectively prevent a short circuit when the DC/DC converter 8 is switched to step up or step down the voltage. Further, by generating the PWM signals by the method as shown in FIG. 4, the PWM signals can be easily generated without using any special hardware.

In the power conditioning system 100 of the present embodiment, the ripple suppressing unit 12 is configured to perform the ripple suppressing process for suppressing the ripple component of the DC link voltage when the magnitude (absolute value) of the passing current through the DC/DC converter 8 for the battery 20 is below the predetermined value. By performing the ripple suppressing process on the basis of such a condition, the generation of the ripple component of the DC link voltage can be effectively suppressed at a more suitable timing. Further, the magnitude of this passing current is detected by the current sensor 71 provided between the two reactors 81a, 81b and the battery 20 as shown in FIG. 1. Since there is no influence of a current distribution variation between the reactors 81a and 81b, a tolerance request for the electrical components on the DC link side is relaxed and the manufacturing cost of the entire power conditioning system 100 can be reduced.

In the power conditioning system 100 of the present embodiment, the ripple suppressing unit 12 may be configured to suppress the ripple component of the DC link voltage when the magnitude of the output current of the fuel cell stack 1 is below a predetermined value. Since the generation of the ripple component of the DC link voltage is concerned also under such a situation, the generation of the ripple component of the DC link voltage can be effectively suppressed at a more suitable timing.

In the first embodiment described above, a case where the three-phase DC/DC converter 5 for the fuel cell stack 1 and the two-phase DC/DC converter 8 for the battery 20 are used is described as an example. However, the present invention is not limited to such a configuration. The DC/DC converter 5 for the fuel cell stack 1 may be a multi-phase DC/DC converter having other than three phases or may be a single-phase DC/DC converter. Further, the DC/DC converter 8 for the battery 20 may be a DC/DC converter having a plurality of phases more than three phases. In this case, to perform the ripple suppressing process described above, two phases may be selected out of three or more phases and the ripple suppressing unit 12 may be composed of a step-up switching element 84x (x means that the phase thereof is an x-phase) of one phase out of the selected phases and a step-down switching element 82y (y means that the phase thereof is a y-phase) of the other phase.

Further, the power conditioning system 100 of the present embodiment in another mode includes the fuel cell stack 1 (fuel cell) to be connected to the drive motor 2 (including the drive inverter 3) serving as a load, the DC/DC converter 5 for the fuel cell stack 1 (fuel cell converter) connected between the fuel cell stack 1 and the drive inverter 3 and configured to convert the output voltage of the fuel cell stack 1 at the predetermined required voltage ratio, the high-voltage battery (secondary battery) 20 (battery) connected in parallel with the fuel cell stack 1 with respect to the drive motor 2 and serving as a power supply source different from the fuel cell stack 1, the DC/DC converter 8 for the battery 20 (battery converter) connected between the battery 20 and the drive inverter 3 and configured to convert the output voltage of the battery 20 at the predetermined required voltage ratio, and the voltage adjusting unit 14 configured to adjust the output voltage of the DC/DC converter 8 to the predetermined voltage to generate the DC link voltage for synchronizing the output voltage of the DC/DC converter 5 and the output voltage of the DC/DC converter 8. Further, in the power conditioning system 100 of the present embodiment, each phase of the multi-phase DC/DC converter 8 having the a-phase and the b-phase includes the step-up switching element 84a, 84b and the step-down switching element 82a, 82b, the sum (100%) of the ON-duty ratio (50%) of the step-up switching element 84b of the b-phase DC/DC converter and the ON-duty ratio (50%) of the step-down switching element 82a of the a-phase DC/DC converter is set larger than the sum (95%) of the ON-duty ratio of the step-up switching element 84a, 84b and the ON-duty ratio of the step-down switching element 82a, 82b in each phase. By adopting such a configuration, the DC/DC converter 8 can be switched to step-up or step-down the voltage without setting any control in the dead zone. In this way, the generation of the ripple component of the DC link voltage can be drastically suppressed.

Further, the control method for the power conditioning system 100 of the present embodiment is a method for controlling the power conditioning system 100 configured as described above and includes adjusting an output voltage of a battery converter to a predetermined voltage to generate a DC link voltage for synchronizing an output voltage of a fuel cell converter and the output voltage of the battery converter, and setting ON-duty ratios of a step-up switching element and a step-down switching element of each phase such that the sum of the ON-duty ratio of the step-up switching element of the battery converter of one phase and the ON-duty ratio of the step-down switching element of the battery converter of the other phase is larger than the sum of the ON-duty ratio of the step-up switching element and the ON-duty ratio of the step-down switching element in each phase. According to such a control method for the power conditioning system 100, the effects of the present embodiment as described above can be achieved.

(Modification of First Embodiment)

A modification of the first embodiment is described below, mainly on points of difference from the first embodiment. In the present modification, parts achieving functions similar to those of the first embodiment described above are denoted by the same reference signs and repeated description is omitted as appropriate.

In the above first embodiment, a case where the ripple suppressing unit of the present invention is constituted of the two-phase (multi-phase) DC/DC converter, each phase including both the step-up switching element and the step-down switching element, has been described. In the present modification, a case where the ripple suppressing unit of the present invention is constituted of a two-phase DC/DC converter, each phase including either one of a step-up switching element and a step-down switching element, is described.

Figure 6:
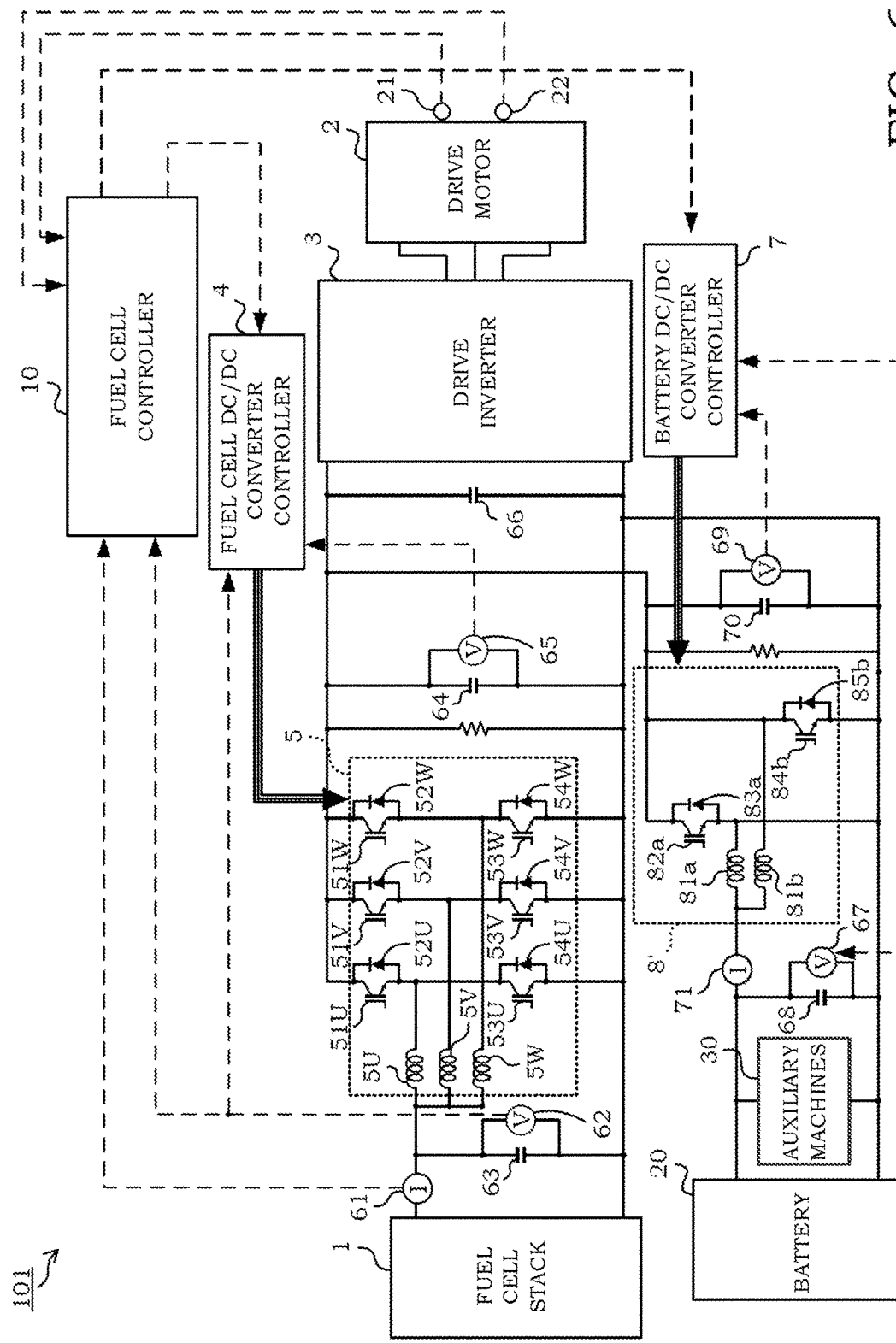
FIG. 6 is a diagram showing an entire configuration of a modification of the power conditioning system for fuel cell in the first embodiment, FIG. 7 are charts showing waveforms of PWM signals to be output to each switching element of a battery DC/DC converter in the modification of the first embodiment.

FIG. 6 is a diagram showing an entire configuration of a modification of the power conditioning system 100 for the fuel cell stack 1 in the first embodiment. A power conditioning system 101 of the present modification differs from the first embodiment in the configuration of the DC/DC converter for the battery 20.

As shown in FIG. 6, a DC/DC converter 8' for the battery 20 in the present modification is a two-phase converter composed of a step-down a-phase converter and a step-up b-phase converter.

The a-phase converter includes a reactor 81a, a step-down side switching element 82a and a rectifying diode 83a. Further, the b-phase converter includes a reactor 81b, a step-up side switching element 84b and a reflux diode 85b. The switching element 82a is connected in reverse parallel to the rectifying diode 83a, and the switching element 84b is connected in reverse parallel to the reflux diode 85a.

One end of the reactor 81a is connected to the output terminal on the positive electrode side of the battery 20 and the other end is connected to one ends of the switching element 82a and the rectifying diode 83a, the output terminal on the negative electrode side of the battery 20 and the input terminal on the negative electrode side of the drive inverter 3. One end of the reactor 81b is connected to the output terminal on the positive electrode side of the battery 20, and the other end is connected to the other ends of the switching element 82a and the rectifying diode 83a and the input terminal on the positive electrode side of the drive inverter 3.

Figure 7:
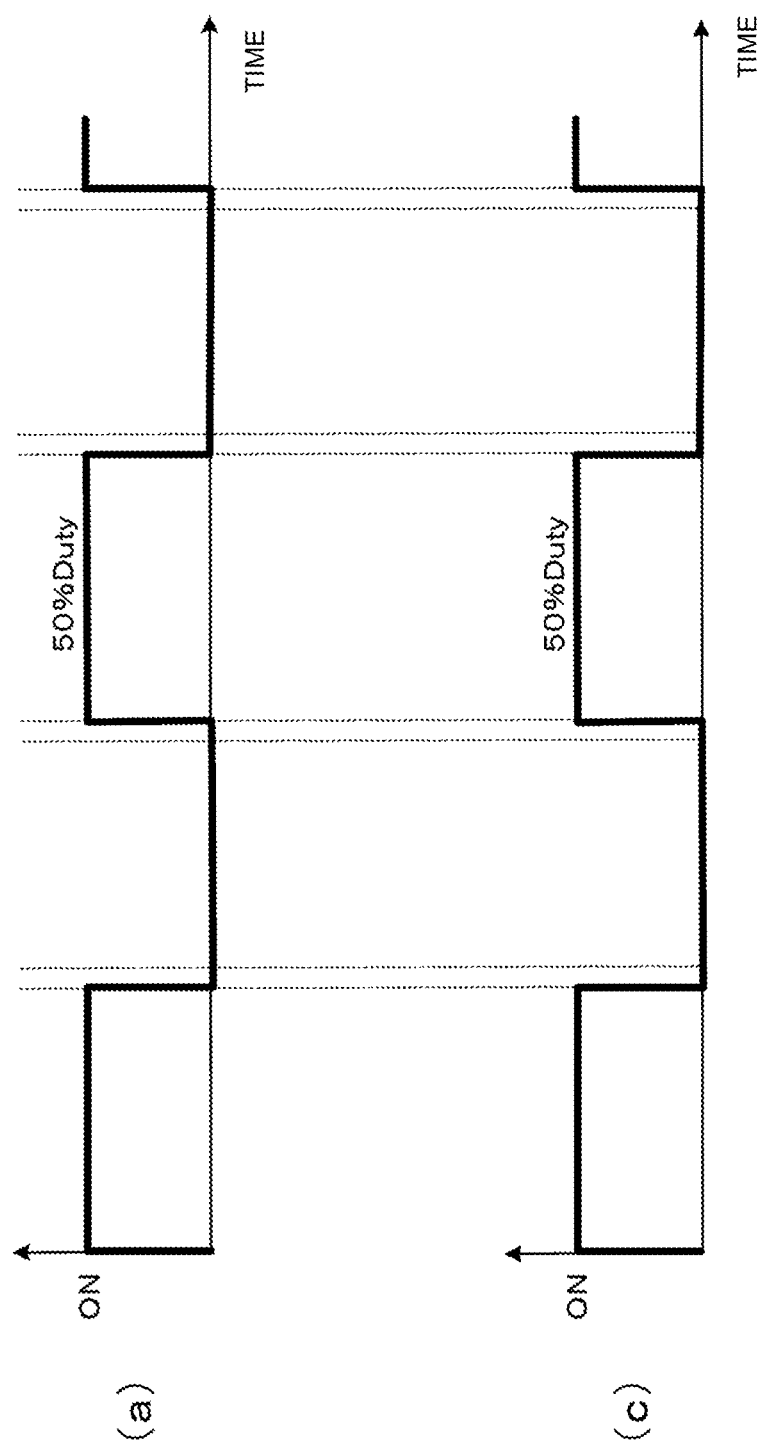

Next, the operation of the power conditioning system 101 of the present modification is described. FIG. 7 show waveforms of PWM signals to be output to each switching element 82a, 84b of the DC/DC converter 8' for the battery 20 in the modification of the first embodiment. It should be noted that a case where the output voltage of the battery 20 is stepped up twofold by the DC/DC converter 8' is described in the present modification.

FIG. 7(a) shows the waveform of the PWM signal to be output to the switching element 82a, and FIG. 7(c) shows the waveform of the PWM signal to be output to the switching element 84b. These two PWM signals are signals having an ON-duty ratio of 50%.

In the present modification, the sum of the ON-duty ratios of each phase is set to be 100% in the DC/DC converter 8' including the step-down a-phase converter and the step-up b-phase converter as just described. In the present modification, effects similar to those of the first embodiment can be achieved by adopting such a configuration.

Further, in the present modification, since the number of the switching elements and the diodes can be reduced particularly in the case of constructing the DC/DC converter 8' from each element, the manufacturing cost of the DC/DC converter 8' can be reduced.

(Second Embodiment)

Hereinafter, a second embodiment of the present invention is described mainly on points of difference from the first embodiment. In the present embodiment, parts achieving functions similar to those of the first embodiment described above are denoted by the same reference signs and repeated description is omitted as appropriate.

In the above first embodiment, the DC/DC converter having a plurality of phases is provided, and the generation of the ripple component of the DC link voltage is suppressed by setting the sum of the ON-duty ratio of the step-up switching element of one phase and the ON-duty ratio of the step-down switching element of the other phase to 100% under the predetermined condition. In the present embodiment, the generation of a ripple component of a DC link voltage is suppressed by increasing or decreasing at least one of power consumed by auxiliary machines and power generated by a fuel cell stack 1 under a predetermined condition.

Figure 8:
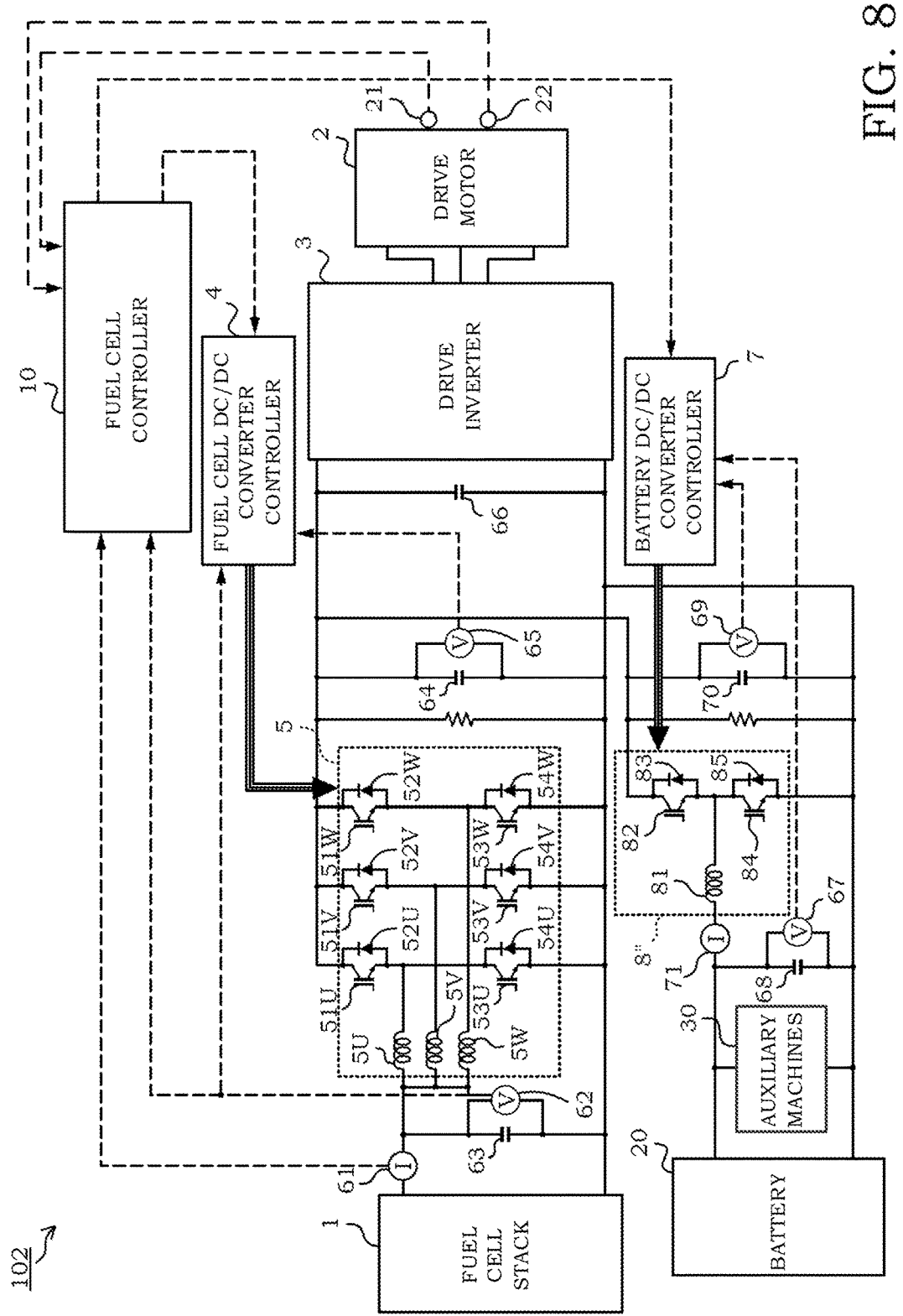
FIG. 8 is a diagram showing an entire configuration of a power conditioning system for fuel cell in a second embodiment of the present invention.

FIG. 8 is a diagram showing an entire configuration of a power conditioning system 102 for the fuel cell stack 1 in the second embodiment of the present invention. As shown in FIG. 8, the power conditioning system 102 of the present embodiment differs in configuration from the power conditioning system 100 of the first embodiment in that a DC/DC converter 8" for a battery 20 has a single phase.

As shown in FIG. 8, this DC/DC converter 8" includes a reactor 81, a step-down side switching element 82, a rectifying diode 83, a step-up side switching element 84 and a reflux diode 85. The switching element 82 is connected in reverse parallel to the rectifying diode 83, and the switching element 84 is connected in reverse parallel to the reflux diode 85. These switching elements 82, 84 are, for example, constituted by IGBTs.

One end of the reactor 81 is connected to an output terminal on a positive electrode side of the battery 20 and the other end is connected to one ends of the switching element 82 and the rectifying diode 83 and one ends of the switching element 84 and the reflux diode 85. The other ends of the switching element 82 and the rectifying diode 83 are connected to an input terminal on a positive electrode side of a drive inverter 3. Further, the other ends of the switching element 84 and the reflux diode 85 are connected to an output terminal on a negative electrode side of the battery 20 and an input terminal on a negative electrode side of the drive inverter 3.

Figure 9:
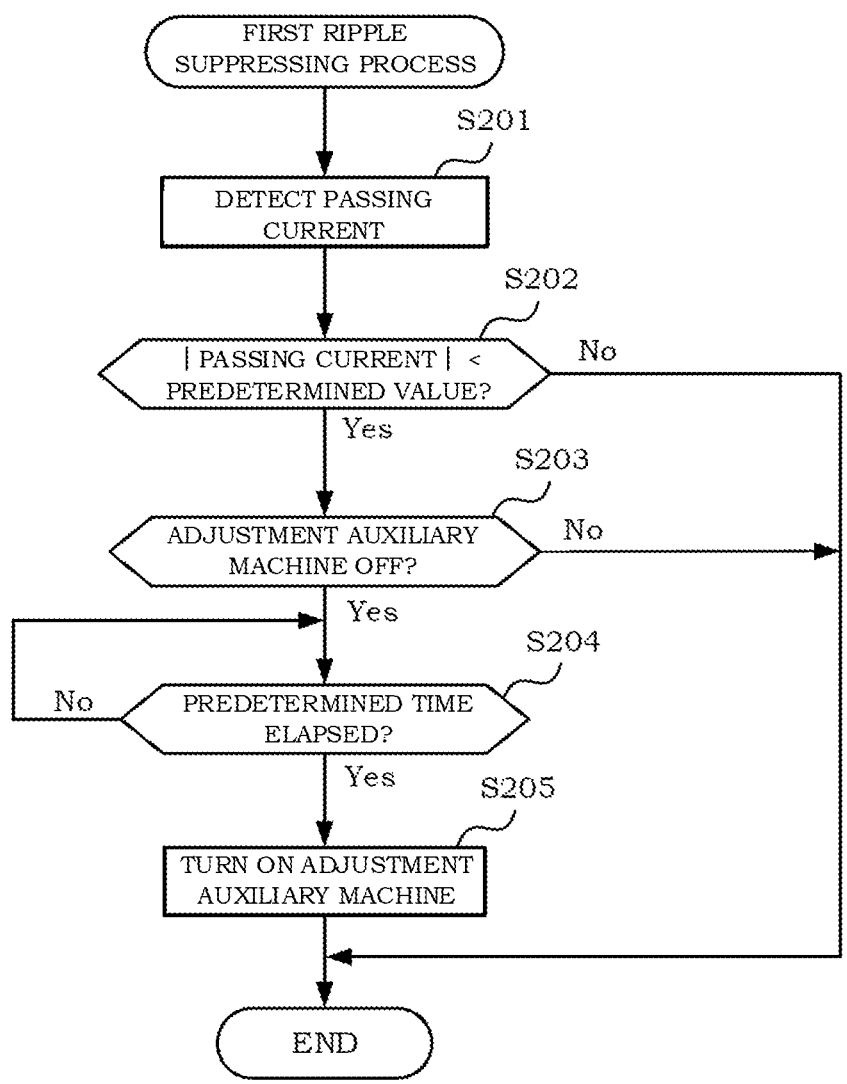
FIG. 9 is a flow chart showing a first ripple suppressing process performed by a fuel cell controller in the present embodiment.
Figure 10:
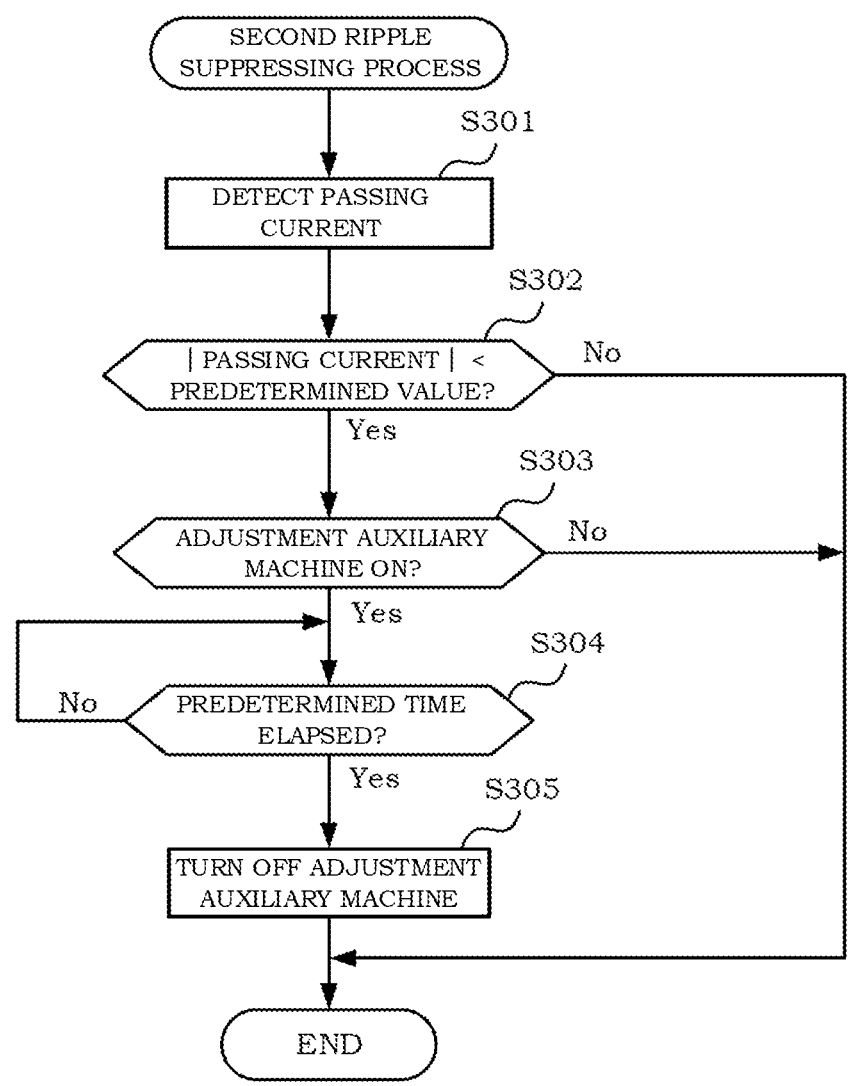
FIG. 10 is a flow chart showing a second ripple suppressing process performed by the fuel cell controller in the present embodiment.

Next, the operation of the power conditioning system 102 in the present embodiment is described with reference to flow charts of FIGS. 9 and 10. FIG. 9 is the flow chart showing a first ripple suppressing process performed by a fuel cell controller 10 in the present embodiment. FIG. 10 is the flow chart showing a second ripple suppressing process performed by the fuel cell controller 10 in the present embodiment. In the present embodiment, the fuel cell controller 10 may successively perform these first and second ripple suppressing processes at a predetermined time interval.

In the first ripple suppressing process, the fuel cell controller 10 detects a passing current through the DC/DC converter 8" using a current sensor 71 (Step S201). Then, the fuel cell controller 10 determines whether or not an absolute value of the detected passing current (in which direction this current flows does not matter) is below a predetermined value (Step S202). If the absolute value of the passing current is determined to be equal to or larger than the predetermined value, the fuel cell controller 10 ends this first ripple suppressing process.

On the other hand, if the absolute value of the passing current is determined to be below the predetermined value, the fuel cell controller 10 determines whether or not an adjustment auxiliary machine set in advance is off (Step S203). Here, the "adjustment auxiliary machine" is an auxiliary machine to be on/off switched under a predetermined condition and constitutes part of the auxiliary machines 30 in the present embodiment. The "adjustment auxiliary machine" is, for example, a defogging heater for windshield and rear glass of a vehicle equipped with the power conditioning system 102 of the present embodiment. As just described, the adjustment auxiliary machine is preferably not related to a control of the fuel cell stack 1.

If the adjustment auxiliary machine is determined to be on, the fuel cell controller 10 ends this first ripple suppressing process. On the other hand, if the adjustment auxiliary machine is determined to be off, the fuel cell controller 10 determines whether or not a predetermined time has elapsed after this state was reached (Step S204). The fuel cell controller 10 waits in Step S204 until the predetermined time elapses.

If the predetermined time is determined to have elapsed, the fuel cell controller 10 turns on the adjustment auxiliary machine (Step S205) and ends this first ripple suppressing process. It should be noted that, in the first ripple suppressing process, the fuel cell controller 10 actively increases the power consumed by the auxiliary machines 30 by turning on the adjustment auxiliary machine, using the continuation of a state, where the passing current through the DC/DC converter 8" is below the predetermined value, for the predetermined time as a trigger. Since the amount of current flowing through the reactor 81 of the DC/DC converter 8" increases in this way, it can be prevented that the direction of the current flowing through the reactor 81 of the DC/DC converter 8" is frequently switched. Thus, effects similar to those of the first embodiment can be achieved.

The fuel cell controller 10 subsequently performs the second ripple suppressing process. In the second ripple suppressing process, a case where the passing current through the DC/DC converter 8" for the battery 20 is below the predetermined value can be dealt with by making a determination opposite to the first ripple suppressing process.

In the second ripple suppressing process, the fuel cell controller 10 detects a passing current through the DC/DC converter 8" using the current sensor 71 (Step S301) as in the first ripple suppressing process. Then, the fuel cell controller 10 determines whether or not an absolute value of the detected passing current (in which direction this current flows does not matter) is below the predetermined value (Step S302). If the absolute value of the passing current is determined to be equal to or larger than the predetermined value, the fuel cell controller 10 ends this second ripple suppressing process.

On the other hand, if the absolute value of the passing current is determined to be below the predetermined value, the fuel cell controller 10 determines whether or not the adjustment auxiliary machine set in advance is on (Step S303).

If the adjustment auxiliary machine is determined to be off, the fuel cell controller 10 ends this second ripple suppressing process. On the other hand, if the adjustment auxiliary machine is determined to be on, the fuel cell controller 10 determines whether or not a predetermined time has elapsed after this state was reached (Step S304). The fuel cell controller 10 waits in Step S304 until the predetermined time elapses.

If the predetermined time is determined to have elapsed, the fuel cell controller 10 turns off the adjustment auxiliary machine (Step S305) and ends this second ripple suppressing process. It should be noted that, in the second ripple suppressing process, the fuel cell controller 10 actively decreases the power consumed by the auxiliary machines 30 by turning off the adjustment auxiliary machine, using the continuation of the state where, the passing current through the DC/DC converter 8" is below the predetermined value, for the predetermined time as a trigger. Since the amount of current flowing through the reactor 81 of the DC/DC converter 8" increases in this way, it can be prevented that the direction of the current flowing through the reactor 81 of the DC/DC converter 8" is frequently switched. Thus, effects similar to those of the first embodiment can be achieved.

Figure 11:
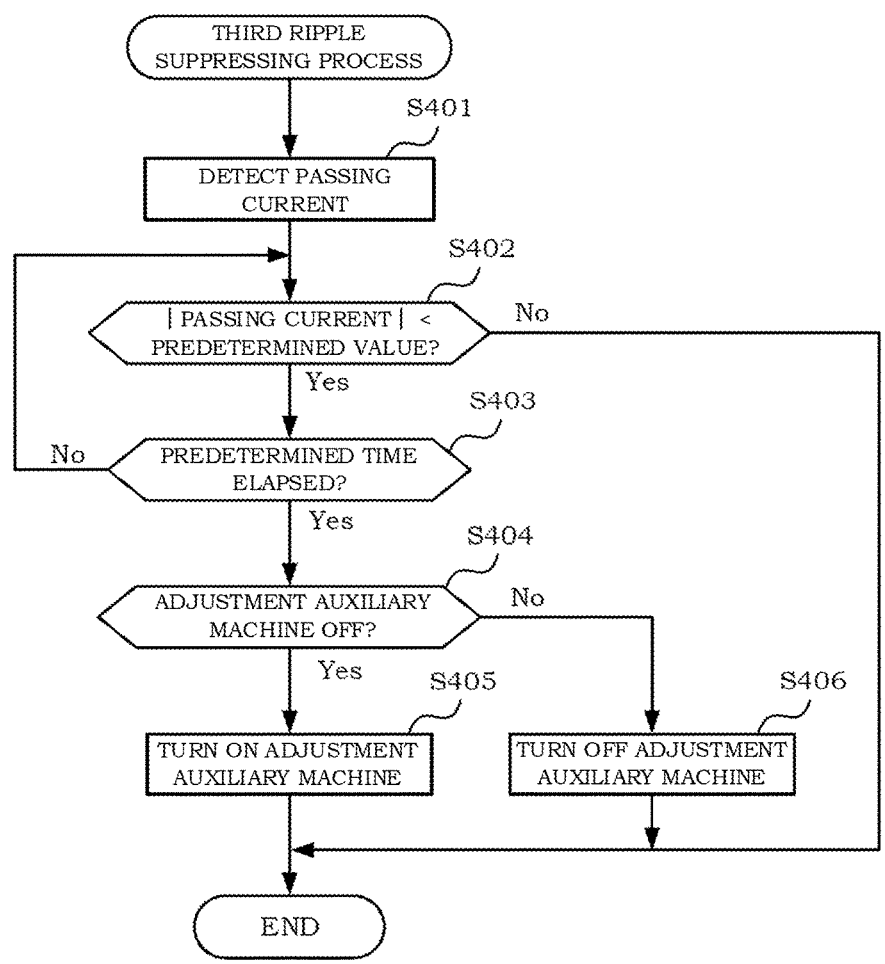
FIG. 11 is a flow chart showing a third ripple suppressing process performed by the fuel cell controller in the present embodiment.

Here, instead of performing the first and second ripple suppressing processes, the fuel cell controller 10 may perform a third ripple suppressing process as a combination of these. FIG. 11 is a flow chart showing the third ripple suppressing process performed by the fuel cell controller 10 in the present embodiment.

In this third ripple suppressing process, the fuel cell controller 10 detects a passing current through the DC/DC converter 8" using the current sensor 71 (Step S401). Then, the fuel cell controller 10 determines whether or not an absolute value of the detected passing current (in which direction this current flows does not matter) is below a predetermined value (Step S402). If the absolute value of the passing current is determined to be equal to or larger than the predetermined value, the fuel cell controller 10 ends this third ripple suppressing process.

On the other hand, if the absolute value of the passing current is determined to be below the predetermined value, the fuel cell controller 10 determines whether or not a predetermined time has elapsed after this state was reached (Step S403). The fuel cell controller 10 repeats the processings of Steps S402 and S403 until the predetermined time elapses.

If the predetermined time is determined to have elapsed, the fuel cell controller 10 determines whether or not the adjustment auxiliary machine is off (Step S404). If the adjustment auxiliary machine is determined to be off, the fuel cell controller 10 turns on the adjustment auxiliary machine (Step S405) and ends this third ripple suppressing process.

On the other hand, if the adjustment auxiliary machine is determined to be on, the fuel cell controller 10 turns off the adjustment auxiliary machine (Step S406) and ends this third ripple suppressing process.

As just described, in the third ripple suppressing process, the fuel cell controller 10 actively increases or decreases the power consumed by the auxiliary machines 30 by turning on/off the adjustment auxiliary machine, using the continuation of the state where, the passing current through the DC/DC converter 8" is below the predetermined value, for the predetermined time as a trigger. Since the amount of current flowing through the reactor 81 of the DC/DC converter 8" increases or decreases in this way, it can be prevented that the direction of the current flowing through the reactor 81 of the DC/DC converter 8" is frequently switched. Thus, effects similar to those of the first embodiment can be achieved.

As described above, the power conditioning system 102 of the present embodiment includes the fuel cell stack 1 (fuel cell) to be connected to a drive motor 2 (including the drive inverter 3) serving as a load, a DC/DC converter 5 for the fuel cell stack 1 (fuel cell converter) connected between the fuel cell stack 1 and the drive inverter 3 and configured to convert the output voltage of the fuel cell stack 1 at a predetermined required voltage ratio, a high-voltage battery (secondary battery) 20 (battery) connected in parallel with the fuel cell stack 1 with respect to the drive motor 2 and serving as a power supply source different from the fuel cell stack 1 and the DC/DC converter 8" for the battery 20 (battery converter) connected between the battery 20 and the drive inverter 3 and configured to convert the output voltage of the battery 20 at a predetermined required voltage ratio. Further, the power conditioning system 102 of the present embodiment includes a voltage adjusting unit 14 configured to adjust an output voltage of the DC/DC converter 8" to a predetermined voltage to generate a DC link voltage for synchronizing the output voltage of the DC/DC converter 5 and the output voltage of the DC/DC converter 8" and a ripple suppressing unit 12 configured to suppress a ripple component of the DC link voltage by the DC/DC converter 8" on the basis of power generated by the fuel cell stack 1 and power required by the drive motor 2 in a situation where the DC link voltage is higher than the output voltage of the battery 20. In the power conditioning system 102 of the present embodiment, the ripple suppressing unit 12 is configured to increase or decrease at least one of the power consumed by the adjustment auxiliary machine, out of the auxiliary machines 30, and the power generated by the fuel cell stack 1 such that the magnitude of the passing current through the DC/DC converter 8" for the battery 20 does not remain below the predetermined value. Since the power conditioning system 102 of the present embodiment is configured as described above, the following functions and effects are achieved.

Specifically, according to the power conditioning system 102 of the present embodiment, the effects of the first embodiment described above can be achieved by a simple configuration for monitoring the passing current through the DC/DC converter 8".

Further, a control method for the power conditioning system 102 of the present embodiment is a method for controlling the power conditioning system 102 configured as described above and includes detecting the magnitude of the passing current through the DC/DC converter 8" using the current sensor 71, determining whether or not the magnitude of the detected passing current through the DC/DC converter 8" is below the predetermined value and increasing or decreasing at least one of the power consumed by the auxiliary machines 30 and the power generated by the fuel cell stack 1 if the magnitude of the passing current through the DC/DC converter 8" is determined to be below the predetermined value. According to such a control method for the power conditioning system 102, the effects of the present embodiment as described above can be achieved.

It should be noted that a case where the three-phase DC/DC converter 5 for the fuel cell stack 1 and the single-phase DC/DC converter 8" for the battery 20 are used has been described as an example in the present embodiment. However, the present invention is not limited to such a configuration. The DC/DC converter 5 for the fuel cell stack 1 may be a multi-phase DC/DC converter having other than three phases or may be a single-phase DC/DC converter. Further, the DC/DC converter 8" for the battery 20 may be a multi-phase DC/DC converter having two or more phases.

(Modification of Second Embodiment)

A modification of the second embodiment is described below, mainly on points of difference from the second embodiment. It should be noted that since the entire configuration of the power conditioning system 102 is as in the second embodiment described above, the present modification is described using FIG. 8.

In the above second embodiment, the passing current through the reactor 81 of the DC/DC converter 8" has been increased or decreased by on/off switching the adjustment auxiliary machine under the predetermined condition in the first to third ripple suppressing processes. In the present modification, the passing current through the reactor 81 of the DC/DC converter 8" is increased by increasing the power consumed by the fuel cell stack 1 instead of turning on/off the adjustment auxiliary machine.

Figure 12:
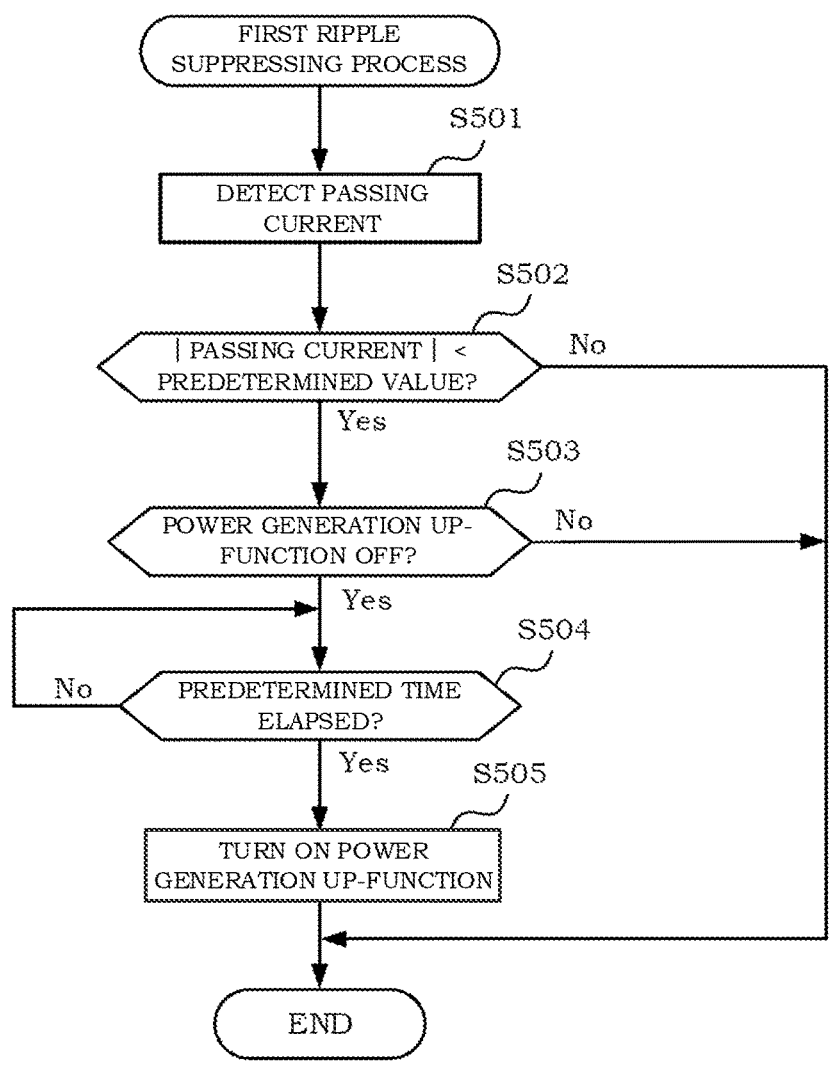
FIG. 12 is a flow chart showing a first ripple suppressing process performed by a fuel cell controller in a modification of the second embodiment.
Figure 13:
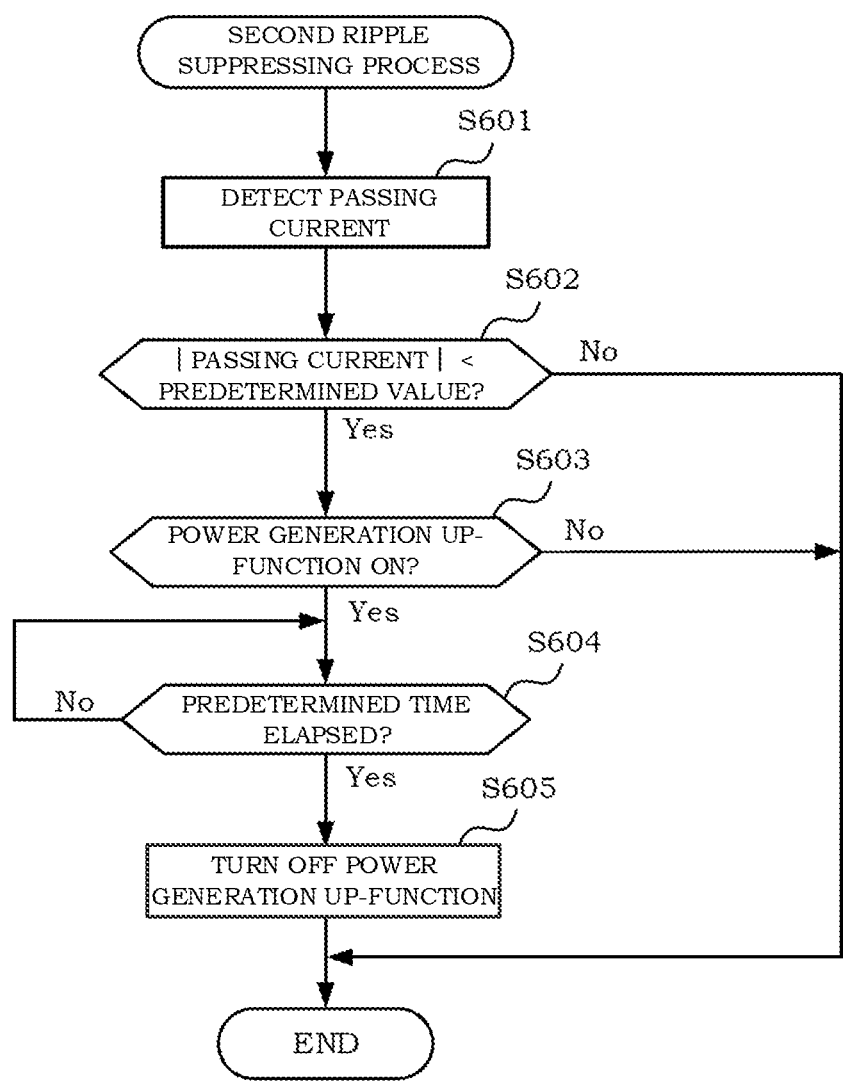
FIG. 13 is a flow chart showing a second ripple suppressing process performed by the fuel cell controller in the modification of the second embodiment.

The operation of the power conditioning system 102 in the present modification is described with reference to flow charts of FIGS. 12 and 13. FIG. 12 is the flow chart showing a first ripple suppressing process performed by a fuel cell controller 10 in the modification of the second embodiment. FIG. 13 is the flow chart showing a second ripple suppressing process performed by the fuel cell controller 10 in the modification of the second embodiment. Also in the present modification, the fuel cell controller 10 may successively perform these first and second ripple suppressing processes at a predetermined time interval as in the second embodiment.

In the first ripple suppressing process, the fuel cell controller 10 detects a passing current through the DC/DC converter 8" using the current sensor 71 (Step S501). Then, the fuel cell controller 10 determines whether or not an absolute value of the detected passing current (in which direction this current flows does not matter) is below a predetermined value (Step S502). If the absolute value of the passing current is determined to be equal to or larger than the predetermined value, the fuel cell controller 10 ends this first ripple suppressing process.

On the other hand, if the absolute value of the passing current is determined to be below the predetermined value, the fuel cell controller 10 determines whether or not a power generation UP-function, which is a power generation setting mode of the fuel cell stack 1 set in advance, is off (Step S503). Here, the "power generation UP-function" is a function of increasing power generated by the fuel cell stack 1 under a predetermined condition in the present modification. By increasing the power generated by the fuel cell stack 1, surplus power is accumulated in the battery 20 via the DC/DC converter 8".

If the power generation UP-function is determined to be on, the fuel cell controller 10 ends this first ripple suppressing process. On the other hand, if the power generation UP-function is determined to be off, the fuel cell controller 10 determines whether or not a predetermined time has elapsed after this state was reached (Step S504). The fuel cell controller 10 waits in Step S504 until the predetermined time elapses.

If the predetermined time is determined to have elapsed, the fuel cell controller 10 turns on the power generation UP-function (Step S505) and ends this first ripple suppressing process. It should be noted that, in the first ripple suppressing process, the fuel cell controller 10 actively charges the battery 20 by turning on the power generation UP-function, using the continuation of a state, where the passing current through the DC/DC converter 8" is below the predetermined value, for the predetermined time as a trigger. Since the amount of current flowing through the reactor 81 of the DC/DC converter 8" increases in this way, it can be prevented that the direction of the current flowing through the reactor 81 of the DC/DC converter 8" is frequently switched. Thus, effects similar to those of the first embodiment can be achieved.

The fuel cell controller 10 subsequently performs the second ripple suppressing process. In the second ripple suppressing process, a case where the passing current through the DC/DC converter 8" for the battery 20 is below the predetermined value can be dealt with by making a determination opposite to the first ripple suppressing process.

In the second ripple suppressing process, the fuel cell controller 10 detects a passing current through the DC/DC converter 8" using the current sensor 71 (Step S601) as in the first ripple suppressing process. Then, the fuel cell controller 10 determines whether or not an absolute value of the detected passing current (in which direction this current flows does not matter) is below a predetermined value (Step S602). If the absolute value of the passing current is determined to be equal to or larger than the predetermined value, the fuel cell controller 10 ends this second ripple suppressing process.

On the other hand, if the absolute value of the passing current is determined to be below the predetermined value, the fuel cell controller 10 determines whether or not the power generation UP-function set in advance is on (Step S603).

If the power generation UP-function is determined to be off, the fuel cell controller 10 ends this second ripple suppressing process. On the other hand, if the power generation UP-function is determined to be on, the fuel cell controller 10 determines whether or not a predetermined time has elapsed after this state was reached (Step S604). The fuel cell controller 10 waits in Step S604 until the predetermined time elapses.

If the predetermined time is determined to have elapsed, the fuel cell controller 10 turns off the power generation UP-function (Step S605) and ends this second ripple suppressing process. It should be noted that, in the second ripple suppressing process, the fuel cell controller 10 actively discharges the battery 20 by turning off the power generation UP-function, using the continuation of the state, where the passing current through the DC/DC converter 8" is below the predetermined value, for the predetermined time as a trigger. Since the amount of current flowing through the reactor 81 of the DC/DC converter 8" increases in this way, it can be prevented that the direction of the current flowing through the reactor 81 of the DC/DC converter 8" is frequently switched. Thus, effects similar to those of the first embodiment can be achieved.

Figure 14:
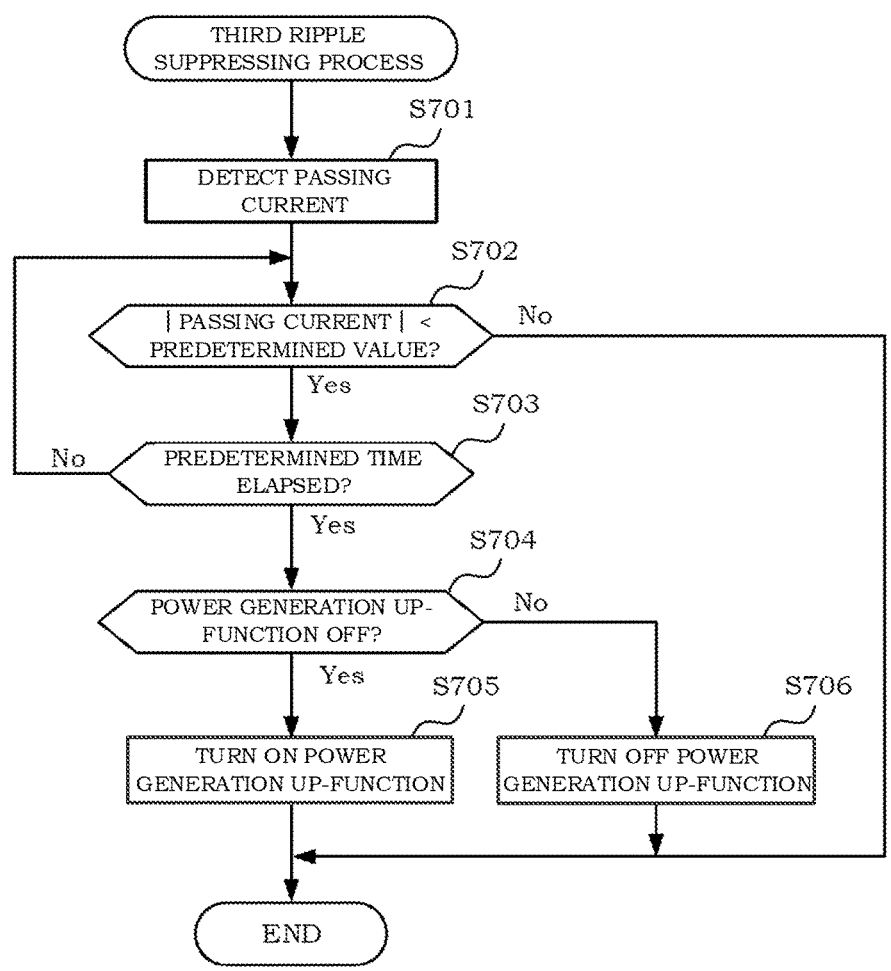
FIG. 14 is a flow chart showing a third ripple suppressing process performed by the fuel cell controller in the modification of the second embodiment.

Next, instead of performing the first and second ripple suppressing processes, the fuel cell controller 10 may perform a third ripple suppressing process as a combination of these as in the second embodiment. FIG. 14 is a flow chart showing the third ripple suppressing process performed by the fuel cell controller 10 in the modification of the second embodiment.

In this third ripple suppressing process, the fuel cell controller 10 detects a passing current through the DC/DC converter 8" using the current sensor 71 (Step S701). Then, the fuel cell controller 10 determines whether or not an absolute value of the detected passing current (in which direction this current flows does not matter) is below a predetermined value (Step S702). If the absolute value of the passing current is determined to be equal to or larger than the predetermined value, the fuel cell controller 10 ends this third ripple suppressing process.

On the other hand, if the absolute value of the passing current is determined to be below the predetermined value, the fuel cell controller 10 determines whether or not a predetermined time has elapsed after this state was reached (Step S703). The fuel cell controller 10 repeats the processings of Steps S702 and S703 until the predetermined time elapses.

If the predetermined time is determined to have elapsed, the fuel cell controller 10 determines whether or not the power generation UP-function is off (Step S704). If the power generation UP-function is determined to be off, the fuel cell controller 10 turns on the power generation UP-function (Step S705) and ends this third ripple suppressing process.

On the other hand, if the power generation UP-function is determined to be on, the fuel cell controller 10 turns off the power generation UP-function (Step S706) and ends this third ripple suppressing process.

As just described, in the third ripple suppressing process, the fuel cell controller 10 actively charges/discharges the battery 20 by turning on/off the power generation UP-function of the fuel cell stack 1, using the continuation of the state, where the passing current through the DC/DC converter 8″ is below the predetermined value, for the predetermined time as a trigger. Since the amount of current flowing through the reactor 81 of the DC/DC converter 8″ increases in this way, it can be prevented that the direction of the current flowing through the reactor 81 of the DC/DC converter 8″ is frequently switched. Thus, effects similar to those of the first embodiment can be achieved.

Although the embodiments of the present invention have been described above, the above embodiments are merely an illustration of some application examples of the present invention and not intended to limit the technical scope of the present invention to the specific configurations of the above embodiments.

In the above first and second embodiments, a case where the output voltage of the battery 20 is stepped up twofold by the DC/DC converter 8, 8′, 8″, i.e. the ON-duty ratio of each switching element is 50% has been described. However, the output voltage can be stepped up manyfold according to power required by the load while the effects of the present invention are achieved as long as a control is executed such that the sum of the ON-duty ratio of the step-down switching element of one phase and the ON-duty ratio of the step-up switching element of the other phase becomes 100%.

Further, in the above first embodiment, the fuel cell controller 10 of the power conditioning system 100 has been described to perform the process for generating the PWM signals for ripple suppression if the absolute value of the passing current through the DC/DC converter 8 is below the predetermined value. However, the present invention is not limited only to such a situation. For example, also in a normal operating state of the power conditioning system 100, PWM signals for ripple suppression may be generated to drive each phase of the two-phase DC/DC converter 8. By adopting such a configuration, the effects of the present invention as described above can be sufficiently achieved. In addition, since the passing current can be shared by two reactors of the two-phase converter even if the absolute value of the passing current through the DC/DC converter 8 becomes large, the generation of the ripple component can be suppressed as compared to the case of a single-phase converter.

The invention claimed is:

1. A power conditioning system, comprising:
a fuel cell configured to be connected to a load;
a fuel cell converter connected between the fuel cell and the load, the fuel cell converter configured to convert an output voltage of the fuel cell at a predetermined required voltage ratio;
a battery connected in parallel with the fuel cell with respect to the load, the battery serving as a power supply source different from the fuel cell;
a battery converter connected between the battery and the load, the battery converter configured to convert an output voltage of the battery at a predetermined required voltage ratio;
a voltage adjusting unit configured to adjust an output voltage of the battery converter to a predetermined voltage to generate a DC link voltage for synchronizing an output voltage of the fuel cell converter and the output voltage of the battery converter; and
a ripple suppressing unit configured to cause the battery converter to suppress a ripple component of the DC link voltage in a situation where the DC link voltage is higher than the output voltage of the battery.

2. The power conditioning system according to claim 1, wherein:
the battery converter has a plurality of phases;
each phase of the battery converter includes a step-up switching element and a step-down switching element;
the ripple suppressing unit is configured to include a step-up switching element of one phase and a step-down switching element of an other phase; and
the ripple suppressing unit is configured to set a duty ratio of each of the step-up switching element of the one phase and the step-down switching element of the other phase such that a sum of an ON-duty ratio of the step-up switching element of the one phase and an ON-duty ratio of the step-down switching element of the other phase is larger than a sum of an ON-duty ratio of the step-up switching element and an ON-duty ratio of the step-down switching element in each phase.

3. The power conditioning system according to claim 2, wherein:
the ripple suppressing unit is configured to set the sum of the ON-duty ratio of the step-up switching element of the one phase and the ON-duty ratio of the step-down switching element of the other phase to 100%.

4. The power conditioning system according to claim 2, wherein:
a dead time is set between the step-up switching element and the step-down switching element in the battery converter of each phase.

5. The power conditioning system according to claim 1, wherein:
the ripple suppressing unit causes the ripple component of the DC link voltage to be suppressed when a magnitude of a passing current through the battery converter is below a predetermined value.

6. The power conditioning system according to claim 1, wherein:
the ripple suppressing unit causes the ripple component of the DC link voltage to be suppressed when a magnitude of an output current of the fuel cell is below a predetermined value.

7. The power conditioning system according to claim 1, further comprising:
auxiliary machines configured to operate the fuel cell or the load;
wherein the ripple suppressing unit increases or decreases at least one of power consumed by the auxiliary machines or power generated by the fuel cell such that a magnitude of a passing current through the battery converter does not remain below a predetermined value.

8. A power conditioning system, comprising:
a fuel cell configured to be connected to a load;
a fuel cell converter connected between the fuel cell and the load, the fuel cell converter configured to convert an output voltage of the fuel cell at a predetermined required voltage ratio;
a battery connected in parallel with the fuel cell with respect to the load, the battery serving as a power supply source different from the fuel cell;
a battery converter connected between the battery and the load, the battery converter having a plurality of phases, the battery converter configured to convert an output voltage of the battery at a predetermined required voltage ratio; and a voltage adjusting unit configured to adjust an output voltage of the battery converter to a predetermined voltage to generate a DC link voltage for synchronizing an output voltage of the fuel cell converter and the output voltage of the battery converter; wherein:

each phase of the battery converter includes a step-up switching element and a step-down switching element; and a sum of an ON-duty ratio of the step-up switching element of one phase and an ON-duty ratio of the step-down switching element of an other phase is set larger than a sum of an ON-duty ratio of the step-up switching element and an ON-duty ratio of the step-down switching element in each phase.

9. A power conditioning system, comprising:

a fuel cell configured to be connected to a load;

a fuel cell converter connected between the fuel cell and the load, the fuel cell converter configured to convert an output voltage of the fuel cell at a predetermined required voltage ratio;

a battery connected in parallel with the fuel cell with respect to the load, the battery serving as a power supply source different from the fuel cell;

a battery converter connected between the battery and the load, the battery converter configured to convert an output voltage of the battery at a predetermined required voltage ratio;

a voltage adjusting unit configured to adjust an output voltage of the battery converter to a predetermined voltage to generate a DC link voltage for synchronizing an output voltage of the fuel cell converter and the output voltage of the battery converter;

a ripple suppressing unit configured to cause the battery converter to suppress a ripple component of the DC link voltage on a basis of power generated by the fuel cell and power required by the load in a situation where the DC link voltage is higher than the output voltage of the battery; and auxiliary machines configured to operate the fuel cell;

wherein the ripple suppressing unit is configured to increase or decrease at least one of power consumed by the auxiliary machines or the power generated by the fuel cell such that a magnitude of a passing current through the battery converter does not remain below a predetermined value.

10. A control method for a power conditioning system with:

a fuel cell configured to be connected to a load;

a fuel cell converter connected between the fuel cell and the load, the fuel cell converter configured to convert an output voltage of the fuel cell at a predetermined required voltage ratio;

a battery connected in parallel with the fuel cell with respect to the load, the battery serving as a power supply source different from the fuel cell; and a battery converter connected between the battery and the load, the battery converter configured to convert an output voltage of the battery at a predetermined required voltage ratio;

the battery converter having a plurality of phases;

the control method comprising:

adjusting an output voltage of the battery converter to a predetermined voltage to generate a DC link voltage for synchronizing an output voltage of the fuel cell converter and the output voltage of the battery converter; and setting ON-duty ratios of a step-up switching element and a step-down switching element of each phase such that a sum of an ON-duty ratio of a step-up switching element of one phase and an ON-duty ratio of a step-down switching element of an other phase is larger than a sum of an ON-duty ratio of the step-up switching element and an ON-duty ratio of the step-down switching element in each phase.

11. A control method for a power conditioning system with:

a fuel cell configured to be connected to a load;

a fuel cell converter connected between the fuel cell and the load, the fuel cell converter configured to convert an output voltage of the fuel cell at a predetermined required voltage ratio;

a battery connected in parallel with the fuel cell with respect to the load, the battery serving as a power supply source different from the fuel cell;

a battery converter connected between the battery and the load, the battery converter configured to convert an output voltage of the battery at a predetermined required voltage ratio;

a voltage adjusting unit configured to adjust an output voltage of the battery converter to a predetermined voltage to generate a DC link voltage for synchronizing an output voltage of the fuel cell converter and the output voltage of the battery converter; and auxiliary machines configured to operate the fuel cell, the control method comprising:

detecting a magnitude of a passing current through the battery converter;

determining whether or not the magnitude of the passing current through the battery converter is below a predetermined value; and increasing or decreasing at least one of power consumed by the auxiliary machines or power generated by the fuel cell to suppress a ripple component of the DC link voltage when the magnitude of the passing current through the battery converter is determined to be below the predetermined value.

* * * * *